(12) United States Patent
Petersen et al.

(10) Patent No.: US 10,298,124 B2
(45) Date of Patent: May 21, 2019

(54) HYBRID DCDC POWER CONVERTER WITH INCREASED EFFICIENCY

(71) Applicant: Dialog Semiconductor (UK) Limited, London (GB)

(72) Inventors: Holger Petersen, Pastetten (DE); Jiri Ledr, Ceska Trebova (CZ)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/692,363

(22) Filed: Aug. 31, 2017

(65) Prior Publication Data
US 2018/0175726 A1     Jun. 21, 2018

(30) Foreign Application Priority Data
Dec. 21, 2016   (DE) ........................ 10 2016 225 795

(51) Int. Cl.
*H02M 3/156*     (2006.01)
*H02M 3/07*     (2006.01)
(Continued)

(52) U.S. Cl.
CPC ............. *H02M 3/156* (2013.01); *H02M 3/07* (2013.01); *H02M 3/158* (2013.01);
(Continued)

(58) Field of Classification Search
CPC .... H02M 3/156; H02M 3/158; H02M 3/1588; H02M 3/155; H02M 3/1582;
(Continued)

(56) References Cited

U.S. PATENT DOCUMENTS

2008/0158915 A1\*   7/2008   Williams ................ H02M 3/07
                                                                                                                                   363/21.06
2014/0070787 A1    3/2014   Arno
(Continued)

FOREIGN PATENT DOCUMENTS

DE     10 2015 209 330       11/2016

OTHER PUBLICATIONS

German Office Action, File No. 10 2016 225 795.1, Applicant: Dialog Semiconductor (UK) Limited, dated Oct. 17, 2017, 5 pgs, and English language translation, 4 pgs.

*Primary Examiner* — Bryan R Perez
(74) *Attorney, Agent, or Firm* — Saile Ackerman LLC; Stephen B. Ackerman

(57) ABSTRACT

A power converter to convert power between a first converter voltage at a first converter port and a second converter voltage at a second converter port is presented. It contains a first capacitor network, an inductor and a first switching matrix to arrange the first capacitor network and the inductor within different states. One of the states is a bypass state enabling current to flow from the first converter port or from ground through the first capacitor network to the second converter port without going through the inductor. Another state is an inductor state enabling current to flow from the first converter port or from ground through the inductor to the second converter port. The power converter also includes a control unit to control the first switching matrix repeatedly in a recurrent sequence of the different states.

20 Claims, 20 Drawing Sheets

(51) Int. Cl.
    *H02M 3/335*    (2006.01)
    *H02M 3/44*    (2006.01)
    *H02M 3/158*    (2006.01)
    *H02M 1/00*    (2006.01)

(52) U.S. Cl.
    CPC ......... *H02M 3/33569* (2013.01); *H02M 3/44* (2013.01); *H02M 2001/0003* (2013.01)

(58) Field of Classification Search
    CPC .............. H02M 3/157; H02M 3/1563; H02M 2003/1566; H02M 2003/1557; H02M 2001/0012; H02M 2001/0009; H02M 3/44; H02M 3/33569; H02M 2001/0003; H02M 3/07
    USPC ....................... 323/271, 283–285; 363/59–61
    See application file for complete search history.

(56) References Cited

U.S. PATENT DOCUMENTS

| | | |
|---|---|---|
| 2015/0061613 A1 | 3/2015 | Kondou |
| 2015/0280553 A1* | 10/2015 | Giuliano ................ H02M 3/07 323/282 |
| 2016/0190921 A1 | 6/2016 | Kumar et al. |

* cited by examiner

Controlling the first switching matrix repeatedly in a recurrent sequence of different states, such that a ratio between the first converter voltage and the second converter voltage corresponds to a target conversion ratio. The sequence of different states may comprise the bypass state and the inductor state.

HYBRID DCDC POWER CONVERTER WITH INCREASED EFFICIENCY

TECHNICAL FIELD

The present document relates to a power converter. In particular, the present document relates to a DCDC power converter having an increased power efficiency and providing an increased maximum output current.

BACKGROUND

Over the last years battery powered applications (like smartphones, tablets and notebooks) increased their computing power, screen resolution and display frame rate and added connected standby modes. The increase of computing power was enabled by silicon technology in the sub-micron range approaching 10 nm and below. These ultra-narrow range gate structures exhibit increased leakage current for each transistor. In view of the fact that CPUs (central processing units) and GPUs (graphical processing units) are composed from multiple hundred million transistors, the leakage current of a modern microprocessor is typically significant. To reduce battery consumption, the embedded computing cores are typically disconnected from the power supply as often as possible. As a result of this, the required computing power is provided within short bursts of operation at maximum speed. Hence the power profile of a modern mobile computing device is dominated by relatively long periods of standby currents in the mA range, interrupted with pulses of high peak currents (in the 10 A and higher range). The challenge for a power management unit is the provision of low currents at high conversion efficiency (to optimize battery life time), combined with the provision of high currents without saturation effects and at stable output voltages.

One solution to avoid saturation (and high I2R losses (i.e. resistive losses)) in the current trace from the battery is the usage of a battery pack with cells connected in series. For LiIon/LiPoly cells this results to nominal battery pack voltages of approximately N×3.7V (with N being the number of cells), e.g. 7.4V for a pack with N=2 cells in series (2S) or 11V for a pack with N=3 cells connected in series (3S). The dominant current consumption is typically caused by the processor, comprising transistors that can only sustain voltages at or even below the 1V range. This triggers substantial voltage conversion ratios that cannot be provided efficiently by DCDC converters build with relatively large switches having a relatively high voltage rating and consuming a relatively high gate charge for each switching operation. As a result of this, standard buck converters tend to switch at relatively low frequency, therefore requiring coils with high inductance to provide a reasonable current ripple. These high inductance coils are typically large, especially when high peak currents need to be provided.

One way to address the above challenge is the creation of an intermediate rail (at an intermediate voltage) in between the output voltage of the battery pack and the processor input voltage. This enables the usage of DCDC converters for regulation with switches having a reduced voltage rating and switching at an increased frequency (at unchanged switching losses). As a consequence of an increased switching frequency, the inductance may be reduced for unchanged current ripple. The reduced inductance reduces the DC resistance of the coil and the size of the coils, thereby allowing higher peak currents and a reduced footprint.

Hence, mobile computing devices may make use of e.g. a 5V or a 3.3V intermediate bus. However, the usage of standard (inductive) buck converters having power capabilities that are larger than the processor peak load suffers from the above mentioned limitations, i.e. the converter is either relatively large or provides relatively poor light load efficiency. The cascaded overall efficiency is typically only acceptable if the intermediate bus is generated without any substantial conversion losses (especially during the time dominant light load operation).

If the intermediate bus is allowed to follow the battery pack voltage an unregulated capacitive voltage divider may provide relatively high efficiency for a wide current range and without the need for bulky inductors. Using e.g. a 2:1 converter the output of a 2S battery pack can be converted to the typical voltage range of a 1S pack, enabling the usage of standard low voltage PMICs (power management integrated circuitry). However, the missing regulation can lead to problems, in cases where the battery pack is deep discharged (e.g. towards 5V in case of a 2S battery pack). As the converter provides a fixed 2:1 conversion ratio, the reduced battery voltage directly impacts the voltage at the intermediate bus. The voltage at the intermediate bus may drop further (e.g. by 100-300 mV) in case a load current is pulled. As a result of this, the voltage at the intermediate bus may be below the minimum input voltage required by a cascaded 1S PMIC.

Regulation of the intermediate voltage at the intermediate bus may be provided by using e.g. a 3-Level Buck Converter. As long as the conversion ratio of such a converter is in the range of the embedded capacitive divider (providing e.g. Vin/2) the efficiency of a Multi-Level Converter is only slightly below the efficiency of an unregulated capacitive voltage divider using similar switches. However, the maximum output current of a Multi-Level Converter is limited by the current rating of its inductor. To increase its peak current capability such a converter needs to use larger inductors or route the total current through multiple inductors. The drawback of this approach is an increased BOM (bill of material) cost and an increased PCB (printed circuit board) area.

Another limitation of Multi-Level Converters is light load efficiency in case the conversion ratio is not in the range of the conversion ratio of the inherent capacitive divider. Using e.g. a converter with 2:1 conversion ratio of the embedded capacitive divider for a conversion of 3:1 (e.g. for a 3S battery pack) may result in acceptable efficiency at high current (where resistive loss is dominant), but typically shows poor efficiency at light load, where converter switching losses and inductor core losses determine the achievable efficiency.

SUMMARY

The present document addresses the technical problem of providing a DCDC (i.e. direct current to direct current) power converter having an increased maximum output current capability and providing an increased power efficiency at light loads for an extended range of conversion ratios. The power converter may e.g. be used to provide a regulated intermediate voltage for mobile power applications. According to an aspect, a power converter configured to convert power between a first converter voltage at a first converter port and a second converter voltage at a second converter port is described. The first and second converter voltages may be relative to ground. In particular, a DCDC power converter is described. The power converter may be configured to perform step-down conversion. In such a case power may be transferred from the first converter port to the second converter port. Alternatively, the power converter may be configured to perform step-up conversion. In such a case power may be transferred from the second converter port to the first converter port.

The power converter comprises a first capacitor network and an inductor (e.g. only exactly one inductor). Furthermore, the power converter comprises a first switching matrix configured to arrange the first capacitor network and the inductor within different states. The different states include a bypass state enabling current to flow from the first converter port or from ground through the first capacitor network to the second converter port without going through the inductor. The bypass state may therefore be used to provide current directly to the second converter port without traversing the inductor. As a result of this, the overall converter current at the second converter port may be increased (without increasing the current characteristics of the inductor of the power converter).

Furthermore, the different states include an inductor state enabling current to flow from the first converter port or from ground through the inductor to the second converter port. The inductor state may be used for regulating the first or second converter voltage.

The power converter further comprises a control unit configured to control the first switching matrix repeatedly in a recurrent sequence of different states, wherein the sequence of different states comprises the bypass state and the inductor state. In particular, the control unit may be configured to vary a duty cycle of the different states in dependence of a target conversion ratio between the first converter voltage and the second converter voltage.

By combining a bypass state with an inductor state, a power converter having an increased maximum output current capability and providing an increased power efficiency at light loads may be provided.

It should be noted that the bypass state and the inductor state may be combined within a single operation state. By way of example, an operation state may comprise a bypass path for providing current directly via the capacitor network to the second converter port and an inductor path for providing current via the inductor to the second converter port. As such, the sequence of different states may comprise a (pure) bypass state, a (pure) inductor state and/or a combined bypass/inductor state (comprising a bypass path and an inductor path). In other word, a sequence of different states which comprises a bypass state and an inductor state may comprise (e.g. only a single) combined bypass and inductor state. A bypass state or bypass path is such that current is provided from the first converter port or from ground via the first capacitor network (without going through an inductor, notably without going through the single inductor of the power converter). On the other hand, an inductor state or inductor path is such that current is provided from the first converter port or from ground via the inductor (notably via the single inductor of the power converter).

The control unit may be configured to control the first switching matrix to cycle through the sequence of different states within a cycle duration (i.e. at a varying or fixed commutation cycle rate). Furthermore, the control unit may be configured to vary a duration of the different states, notably of the bypass state and/or of the inductor state, within the cycle duration in dependence of the target conversion ratio. In particular, a relative duration of the different states may be varied. By doing this, the first or second converter voltage may be regulated in accordance to the target conversion ratio.

It should be noted that the switching frequency or cycle duration may vary. Changing towards higher switching frequencies may be beneficial in case of relatively low inductance in combination with conversion ratios different to 2:1 (and/or other rates that do not match the natural conversion ratio of the switching capacitor voltage divider). As such, the cycle duration may vary as the target conversion ratio changes. Otherwise the inductor current ripple could increase. Furthermore, the cycle duration may be dynamically adapted to minimize voltage under- and overshoot during transient load current (notably in case of voltage regulation).

The inductor typically exhibits a saturation current (i.e. a maximum current that may be provided through the inductor). The control unit may be configured to control the first switching matrix such that through use of the bypass state a maximum total converter current at the second converter port is higher than the saturation current of the inductor. As such, the bypass state may be used to increase the total converter current that is provided by the power converter (without the need of using an inductor having increased current capabilities).

The first switching matrix is typically configured to arrange the first capacitor network and the inductor within operation states and transition states, wherein the transition states are used to change from one operation state to a subsequent operation state within the recurrent sequence of different states. The duration of the transition states is typically independent of the target conversion ratio. Usually, the duration of the transition states is minimized, as the transition states result in conversion loss (e.g. body diode conduction loss) and typically have no relevance for the regulation of the first or second converter voltage. The duration of the transition states may be shorter than the duration of the operation states, notably by one or more orders of magnitude.

On the other hand, the duration of (at least some of) the operation states is typically varied when varying the duty cycle. The bypass state and the inductor states are example operation states.

The first capacitor network may have a first port and a second port. Furthermore, the inductor (notably the only inductor of the power converter) may have a first port and a second port. The second port of the inductor may be (directly) coupled to the second converter port and the first port of the inductor may be coupled directly or via a switch to the second port of the first capacitor network (or via a switch to the first port of the first capacitor network).

An operation state may define how the inductor and the first capacitor network are coupled with respect to each other and with respect to the first and/or second converter ports and with respect to ground. Different states typically define different arrangements. The switches described in the present document may be or may comprise transistors, notably field effect transistors such as metal oxide semiconductor transistors.

The second port of the inductor may be coupled (directly) to the second converter port. On the other hand, the first port of the inductor may be coupled directly or via a switch to the first or second port of the first capacitor network.

The first switching matrix may comprise a first switch (typically referred to as S1 in the present document) configured to couple (directly or indirectly) the first port of the first capacitor network with the first converter port. Furthermore, the first switching matrix may comprise a second switch (typically referred to as S2 in the present document) configured to couple the second port of the first capacitor network (directly) with ground. In addition, the first switching matrix may comprise a third switch (typically referred to as S3 in the present document) configured to couple the first port (as is the case e.g. in FIGS. 1A, 1B, 1C) or the second port (as is the case e.g. in FIGS. 1D and 1F) of the first capacitor network (directly) with the second converter port.

The first switching matrix may further comprise a fourth switch (typically referred to as S4 in the present document) configured to couple or to decouple the second port of the first capacitor network (directly) with or from the first port of the inductor (as shown e.g. in FIGS. 1A, 1B). Alternatively, the fourth switch may be configured to couple or to decouple the first port of the first capacitor network (directly) with or from the first port of the inductor (as shown e.g. in FIGS. 1C, 1D).

The power converter may comprise a second capacitor network having a first port and a second port (as shown e.g. in FIGS. 1A, 1B). Furthermore, the power converter may comprise a second switching matrix. The second switching matrix may comprise a fifth switch (typically referred to as S5 in the present document) configured to couple the first converter port (directly) with the first port of the second capacitor network. In addition, the second switching matrix may comprise a sixth switch (typically referred to as S6 in the present document) configured to couple the second port of the second capacitor network (directly) to ground. Furthermore, the second switching matrix may comprise a seventh switch (typically referred to as S7 in the present document) configured to couple the first port of the second capacitor network (directly) with the first port of the inductor. In addition, the second switching matrix may comprise an eight switch (typically referred to as S8 in the present document) configured to couple the second port of the second capacitor network (directly) with the second converter port.

The first and second switching matrices may be configured to arrange the first capacitor network, the second capacitor network and the inductor within different states and the control unit may be configured to control the first and second switching matrices repeatedly in the recurrent sequence of different states. The output current that may be provided by the power converter may be increased when providing a second capacitor network.

The sequence of states may comprise a first state with the first switch, fourth switch, fifth switch and the eight switch being closed. Furthermore, the sequence of states may comprise a second state with the second switch, the third switch, the sixth switch and the seventh switch being closed. An example first state is shown in FIG. 3A and an example second state is shown in FIG. 3B. Such a sequence of states may e.g. be used to provide a conversion ratio of 2:1 between the first and the second converter voltages.

The sequence of states may further comprise a third state with the fifth switch and the seventh switch being closed to couple the inductor between the first converter port and the second converter port and the first and second switching matrices being such that the first and second capacitor networks are floating (as shown e.g. in FIG. 3C). The third state may be used e.g. to provide conversion rates between the first and the second converter voltages which are smaller than 2:1. Alternatively or in addition, the sequence of states may comprise a fourth state with the fourth switch and the second switch being closed to couple the inductor between the second converter port and ground and the first and second switching matrices being such that the first and second capacitor networks are floating (as shown e.g. in FIG. 3E). The fourth state may be used e.g. to provide conversion rates between the first and the second converter voltages which are greater than 2:1.

The sequence of states may be such that a switching state of at least some of the switches of the first and/or second switching matrix remain unchanged for all or a subset of the states of the sequence of states (as outlined e.g. in the context of FIGS. 4A, 4B, 4C and 4D). By maintaining one or more switches within a fixed switching state, switching losses of the power converter may be reduced. A sequence of states with unchanged switching states for one or more switches of the switching matrices may be used at relatively low loads, to further increase the power efficiency of the power converter.

The power converter may comprise a ninth switch which is configured to couple the first port of the first capacitor network with the first port of the second capacitor network (as shown e.g. in FIG. 1B). The control unit may be configured to control the ninth switch in accordance to the sequence of states. In particular, the ninth switch may be used to provide further states (i.e. further arrangements of the first and second capacitor networks and of the inductor).

The ninth switch may be used notably for increasing power efficiency for particular conversion ratios (e.g. in the range of 3:1). For this purpose, the sequence of states may comprise a first state with the third switch, the second switch, the fifth switch and the eight switch being closed to couple the first capacitor network between the second converter port and ground and to couple the second capacitor network between the first and second converter port and the remaining switches being such that the inductor is floating (as shown e.g. in FIG. 5A). In addition, the sequence of states may comprise a second state with the fourth switch, the sixth switch and the ninth switch being closed to couple the inductor and the first and second capacitor networks in series between the second converter port and ground (as shown e.g. in FIG. 5B). Furthermore, the sequence of states may comprise a third state with the sixth switch and the seventh switch being closed (as shown e.g. in FIG. 5C) or the second switch and the fourth switch being closed (as shown e.g. in FIG. 5D) to couple the inductor between the second converter port and ground. The sequence of states may comprise only the first and the second states to provide an (unregulated) conversion ratio of 3:1. Furthermore, a third state (see FIG. 5C) and a fourth state (see FIG. 5D) may be used to provide conversion rates smaller than (FIG. 5C) or greater than (FIG. 5D) 3:1.

Furthermore, the ninth switch may be used to provide an increased efficiency at light loads. For this purpose, the sequence of states may comprise a first state e.g. with the second switch, the third switch, the sixth switch and the ninth switch being closed (see e.g. FIG. 6A). The first state shown in FIG. 6A is a pure bypass state (as is the case of the state shown in FIGS. 4A and 5A). During the first state, the switches of the first and second switching matrices and the ninth switch may be such that the first capacitor network and/or the second capacitor network are arranged between the second converter port and ground, i.e. in parallel to the output capacitance $C_{out}$, and such that the inductor is floating. The sequence of states may further comprise a second state e.g. with the second switch, the third switch, fifth switch and the eight switch being closed (see FIG. 6B). The state shown in FIG. 6B is a pure bypass state. During the second state, the switches of the first and second switching matrices and the ninth switch may be such that the second capacitor network is arranged between the first converter port and the second converter port, such that the first capacitor network is arranged between the second converter port and ground, and such that the inductor is floating.

The first capacitor network may comprise a plurality of capacitors (As shown e.g. in FIGS. 1K and 1L). The first capacitor network may comprise a capacitor switching matrix configured to arrange the plurality of capacitors in different configurations and the control unit may be configured to control the capacitor switching matrix within the sequence of states. By providing capacitor networks having an increase number of capacitors, the number of conversion ratios that can be provided efficiently by the power converter may be increased.

In a further example (as illustrated e.g. in FIG. 1H), the first capacitor network comprises a first port and a second port, the inductor comprises a first port and a second port and the second port of the inductor is coupled to the second converter port. The power converter further comprises a second capacitor network having a first port and a second port. Furthermore, the power converter (notably the first and/or second switching matrix) comprises: a first switch configured to couple the first port of the first capacitor network with the first converter port; a second switch configured to couple the second port of the second capacitor network with ground; a third switch configured to couple the first port of the second capacitor network with the second converter port; a fourth switch configured to couple the first port of the first capacitor network to the first port of the inductor; a fifth switch configured to couple the second port of the second capacitor network to the first port of the inductor; a sixth switch configured to couple the second port of the first capacitor network to the first port of the second capacitor network; and/or a seventh switch configured to couple the second port of the first capacitor network to ground. The switches may be controlled by the control unit to provide different operation states.

In a further example (as illustrated e.g. in FIG. 1G or 1I), the first capacitor network comprises a first port and a second port, the inductor comprises a first port and a second port and the second port of the inductor is coupled to the second converter port. The power converter further comprises a second capacitor network having a first port and a second port. Furthermore, the power converter (notably the first and/or second switching matrix) comprises: a first switch configured to couple the first port of the second capacitor network with the first converter port; a second switch configured to couple the second port of the first capacitor network with ground; a third switch configured to couple the first port of the first capacitor network with the second converter port; a sixth switch configured to couple the first port of the first capacitor network to the first port of the second capacitor network; a seventh switch configured to couple the second port of the second capacitor network to ground; and an eight switch configured to couple the second port of the second capacitor network to the second converter port. The first port of the inductor may be coupled (directly) to the second port of the first capacitor network. Alternatively, the first port of the inductor may be coupled the first port of the first capacitor network via a fourth switch; and/or may be coupled to the second port of the first capacitor network via a fifth switch. The switches may be controlled by the control unit to provide different operation states.

In a further example (as illustrated e.g. in FIG. 1J), the first capacitor network comprises a first port and a second port, the inductor comprises a first port and a second port and the second port of the inductor is coupled to the second converter port. The power converter further comprises a second capacitor network having a first port and a second port. Furthermore, the power converter (notably the first and/or second switching matrix) comprises: a first switch configured to couple the first port of the first capacitor network with the first converter port; a second switch configured to couple the second port of the second capacitor network with ground; a third switch configured to couple the first port of the second capacitor network with the second converter port; a switch configured to couple the second port of the first capacitor network to the first port of the second capacitor network; a switch configured to couple the second port of the first capacitor network to ground; and/or a switch configured to couple the first port of the first capacitor network to the second converter port. The switches may be controlled by the control unit to provide different operation states.

The control unit may be configured to control one or more of the switches of the power converter repeatedly in a recurrent sequence of different states. In other words, different states (or operation states) of the switches of the first switching matrix may be used as operation phases of a commutation or switching cycle of the power converter. In particular, the first switching matrix may be controlled such that a ratio between the first converter voltage and the second converter voltage corresponds to a target conversion ratio. Furthermore, the control unit may be configured to regulate the first and/or second converter voltage to provide a regulated conversion ratio.

By providing one or more switches which are configured to couple the first and/or second capacitor network directly between the first and/or second converter ports and ground (without involving the inductor), an increased maximum output current may be provided (going beyond a current limit of the inductor). Furthermore, the provision of an inductor enables the regulation of the first and/or second converter voltages (depending on whether the first or the second converter voltage is the output voltage of the power converter, i.e. the output voltage of the power converter may be regulated). Hence, a power converter with increased maximum output current and a large range of (regulated) conversion ratios may be provided.

By providing additional switches to the power converter, the number of available states may be increased. The additional states may be used for increasing the power efficiency of the power converter at light loads. Furthermore, the range of possible conversion ratios may be increased. In addition, the maximum output current may be increased further.

As outlined above, the power converter may comprise more than one capacitor network. By providing one or more additional capacitor networks, the maximum output current of the power converter may be increased further. Furthermore, the power efficiency at light loads and the available range of conversion ratios may be increased.

The control unit may be configured to determine a level of a load of the power converter. Furthermore, the control unit may be configured to select states for the sequence of states depending on the level of the load. By way of example, at relatively high loads the sequence of states may involve switching of all the switches of the switching matrices (as described e.g. in the context of FIGS. 3A to 3D). On the other hand, at relatively low loads, a power optimized sequence of states may be used, for which at least one or more of the switches maintain a fixed switching state (as described e.g. in the context of FIGS. 4A to 4D, 5A to 5D and 6A and 6B). By doing this, the overall efficiency of the power converter may be increased.

As indicated above, the sequence of states typically comprises a plurality of different states, wherein the plurality of different states may be repeated at a (fixed) commutation cycle rate. The control unit may be configured to adapt the duration of the plurality of different states within a commutation cycle to adjust the ratio between the first converter voltage and the second converter voltage in accordance to the target conversion ratio. As such, a regulated first or second converter voltage may be provided (depending on whether the first or the second converter voltage is the output voltage of the power converter).

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

As outlined above, the present document is directed at providing a DCDC power converter which provides increased maximum output currents and increased light load power efficiency.

Figure 1A:
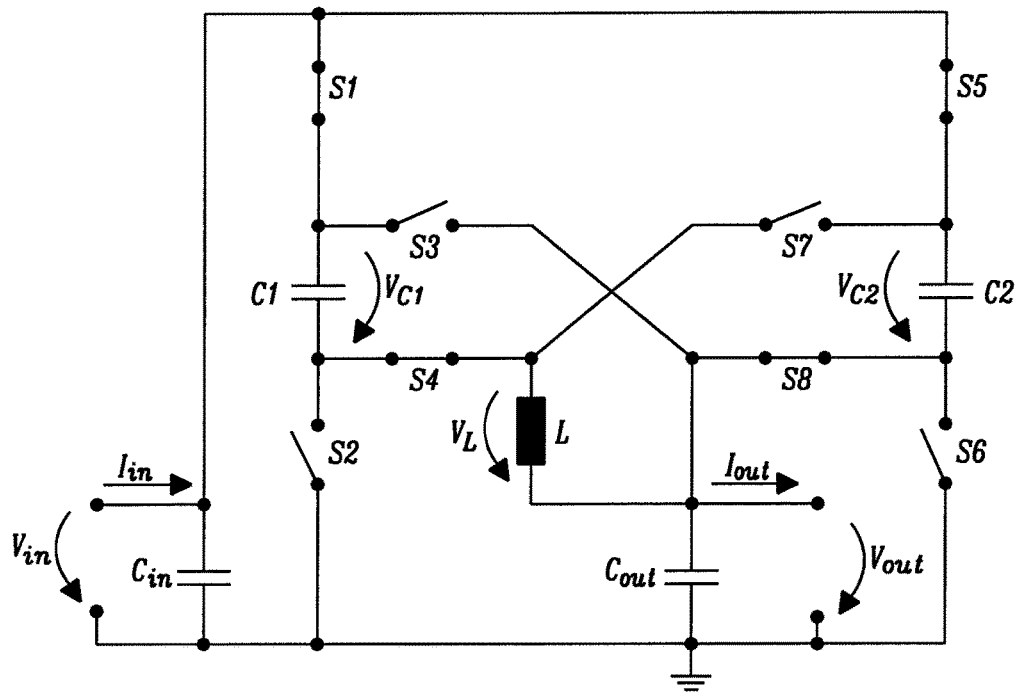
FIG. 1A illustrates an example power converter with two capacitor networks.

FIG. 1A shows a power converter which is configured to convert an input voltage $V_{in}$ (also referred to herein as the first converter voltage) at an input port (also referred to herein as the first converter port) of the power converter into an output voltage $V_{out}$ (also referred to herein as the second converter voltage) at an output port (also referred to herein as the second converter port) of the power converter. The power converter comprises a first flying capacitor C1 and a second flying capacitor C2, as well as an inductor L. In more general terms, the power converter may comprise a first capacitor network (with one or more flying capacitors) and a second capacitor network (with one or more flying capacitors) (as shown e.g. in FIGS. 1K and 1L). A first port of the first capacitor C1 may be (directly) coupled to the input port using a switch S1. Furthermore, the first port of the first capacitor C1 may be (directly) coupled to the output port using a switch S3. A second port of the first capacitor C1 may be (directly) coupled to a first port of the inductor L using a switch S4 and the second port of the first capacitor C1 may be (directly) coupled to ground using a switch S2 (also referred to herein as the ground switch). A first port of the second capacitor C2 may be (directly) coupled to the input port using a switch S5 and the first port of the second capacitor C2 may be (directly) coupled to the first port of the inductor L using a switch S7. A second port of the second capacitor C2 may be (directly) coupled to the output port using a switch S8 and the second port of the second capacitor C2 may be (directly) coupled to ground using a switch S6.

The power converter of FIG. 1A may be used to increase (notably to double) the maximum current $I_{out}$ that can be provided at the output port, compared to e.g. a multi-level converter. Furthermore, the magnetization/demagnetization losses of a single inductor L may be decreased compared to e.g. a converter using two inductors providing together the same total output current, thereby increasing the power efficiency of the power converter. In addition, the power converter allows for a regulation of the output voltage $V_{out}$ through adaption of the duration of different operation states within periodic commutation cycles.

Figure 3A:
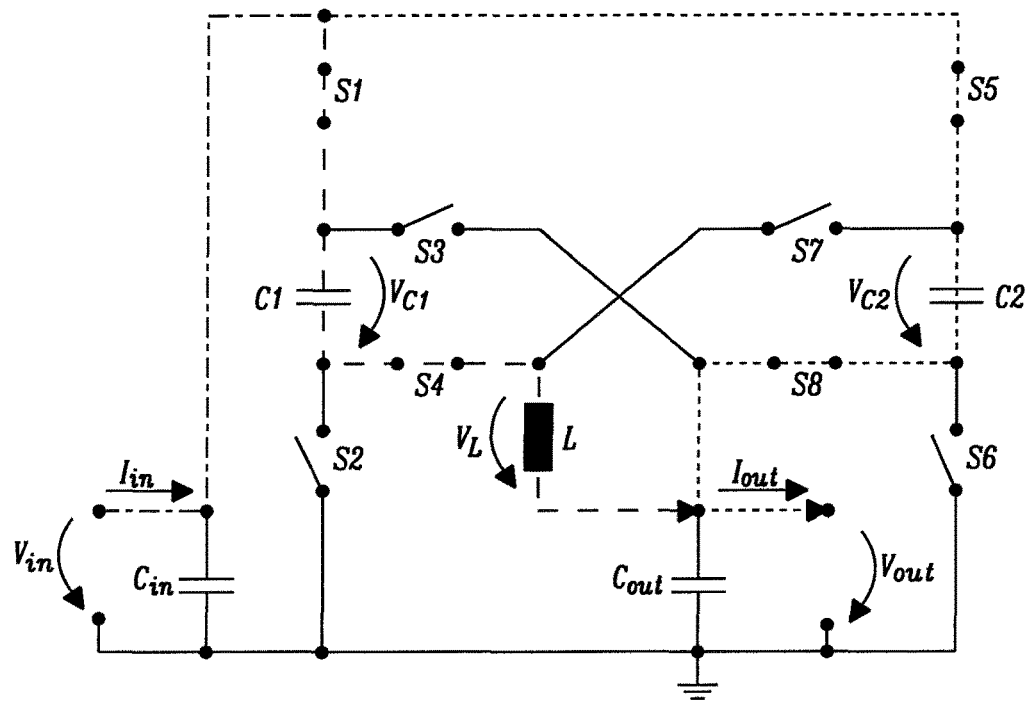
FIGS. 3A, 3B, 3C, 3D, 3E, 3F show different operation states of the power converter of FIG. 1A.

FIGS. 3A to 3D illustrate example operation states. In particular, FIG. 3A shows a first operation state during which the second capacitor C2 is charged (by closing S5 and S8). In particular, C2 may be charged to $V_{C2}=V_{in}-V_{out}$. Furthermore, the first capacitor C1 may be charged via the inductor (by closing S1 and S4). In particular, C1 may be charged to $V_{C1}=V_{in}-V_{out}-V_L$. Furthermore, the inductor L may be magnetized or demagnetized, wherein the voltage across the inductor L is $V_L=V_{in}-V_{out}-V_{C1}$, i.e. the voltage across the inductor L is reduced by the voltage $V_{C1}$ (thereby reducing inductor core losses). The first operation state is a combined bypass state and inductor state. In particular, the first operation state enables the provision of current at the second converter port via the second capacitor C2 (without going through the inductor L), thereby providing a bypass. Furthermore, current may be provided via the first capacitor C1 and the inductor L.

Figure 3B:
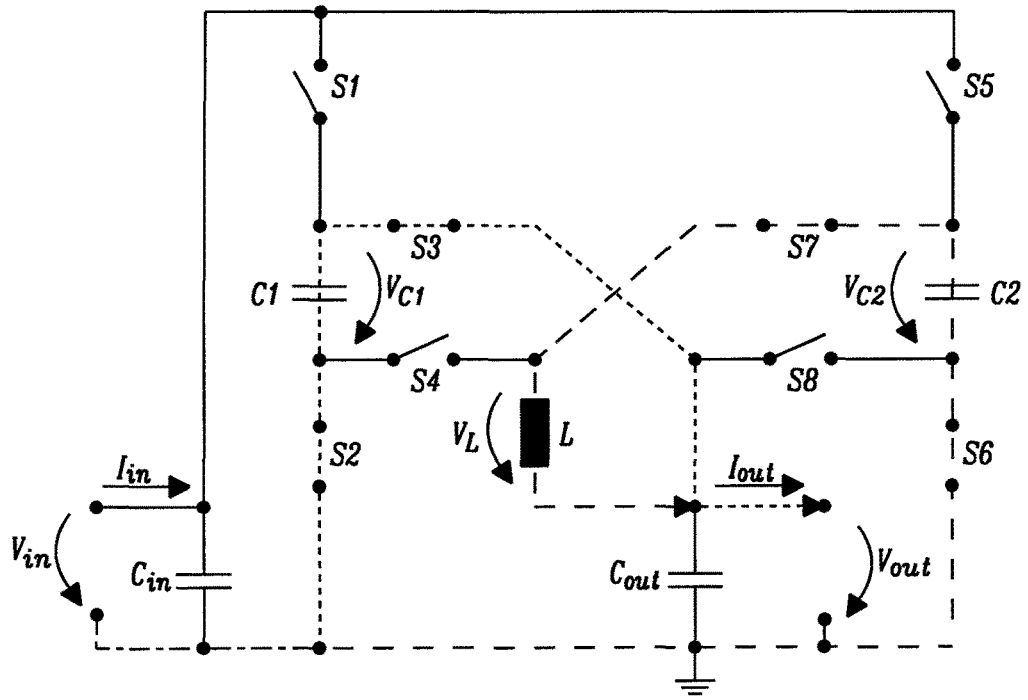
Figure 3C:
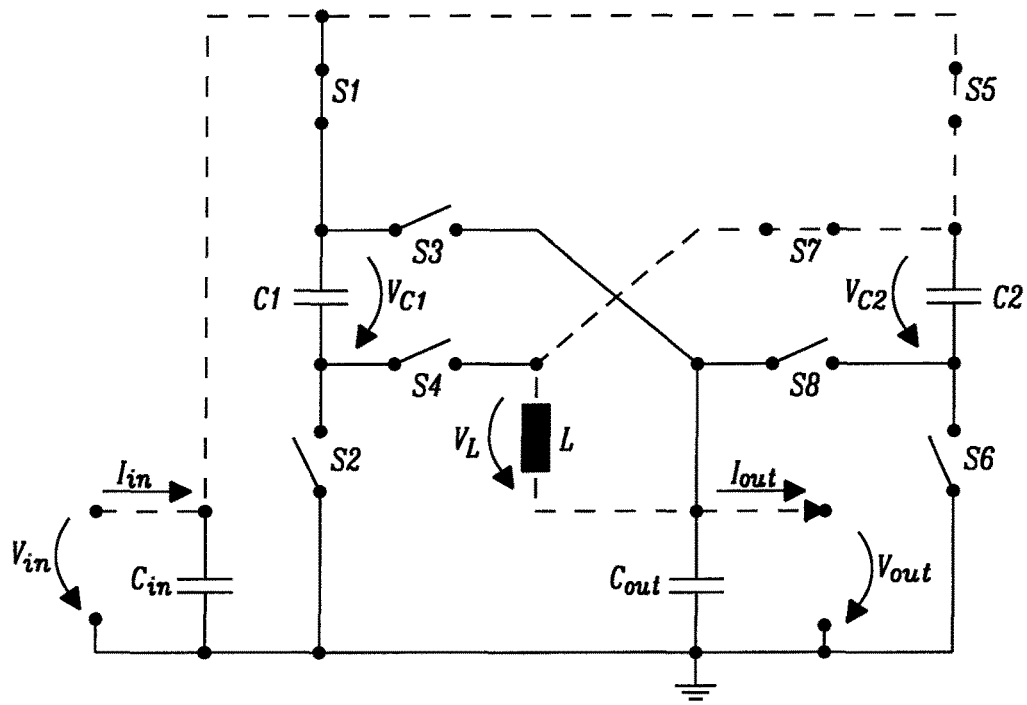

The first operation state may be commutated with the second operation state shown in FIG. 3B. During the second operation state the second capacitor C2 is discharged via the inductor L (by closing S6 and S7), with $V_{C2}=V_{out}-V_L$. Furthermore, the first capacitor C1 is discharged to the output port (by closing S2 and S3), with $V_{C1}=V_{out}$. The second operation state is also a combined bypass state and inductor state. In particular, the second operation state enables the provision of current at the second converter port via the first capacitor C1 (without going through the inductor L), thereby providing a bypass. Furthermore, current may be provided via the second capacitor C2 and the inductor L.

In case of a target conversion ratio of $V_{out}=V_{in}/2$ (i.e. a conversion ratio of 2:1), the first and second operation states may be repeated in a periodic manner, with no substantial magnetization/demagnetization of the inductor L, i.e. with no substantial inductor losses. In case of $V_{out}>V_{in}/2$ (i.e. a conversion ratio of less than 2:1), the inductor L is demagnetized in the first and/or second operation states. A third operation state according to FIG. 3C may be used to magnetize the inductor L. In case of $V_{out}<V_{in}/2$ (i.e. a conversion ratio of more than 2:1), the inductor L is magnetized in the first and/or second operation states. A fourth operation state according to FIG. 3D may be used to demagnetize the inductor L. The third and fourth operation states are pure inductor states (as all the current which is provided at the second converter port is going through the inductor L).

The power converter of FIG. 1A may be viewed as a particular combination of an unregulated capacitive voltage divider and a regulating 3-level power converter. In particular, the power converter of FIG. 1A adds voltage regulation capability to a capacitive voltage divider and/or increases output current capability of a multi-level power converter (by a factor of up to two).

During provision of power the power converter of FIG. 1A may toggle between the two main operation states shown in FIG. 3A and FIG. 3B. The third operation state according to FIG. 3C may be inserted during the transition from the state of FIG. 3A to the state of FIG. 3B and/or at the transition from the state of FIG. 3B to FIG. 3A whenever Vout>Vin/2 and/or during rising transient load current. The fourth operation state according to FIG. 3E may be inserted during the transition from the state of FIG. 3A to the state of FIG. 3B and/or at the transition from the state of FIG. 3B to FIG. 3A whenever $V_{out}<V_{in}/2$ and/or during falling transient load current.

During the operation states of FIG. 3A and FIG. 3B the power converter of FIG. 1A provides two separate output current paths, one output current path that goes through the inductor L (similar to a multi-level converter) and one output current path directly to the output port (similar to a capacitive divider).

The topology shown in FIG. 1A does not require any regulation of the flying capacitor voltage, because the voltage $V_{C1}$ at the first capacitor C1 automatically converges to a voltage in the range of the output voltage $V_{out}$ and the voltage $V_{C2}$ at the second capacitor C2 automatically stabilizes at a voltage level around $V_{in}-V_{out}$. This is beneficial compared to conventional multi-level power converters which typically require an active regulation of the voltage at a flying capacitor (by adapting the switching duty cycle).

Figure 3D:
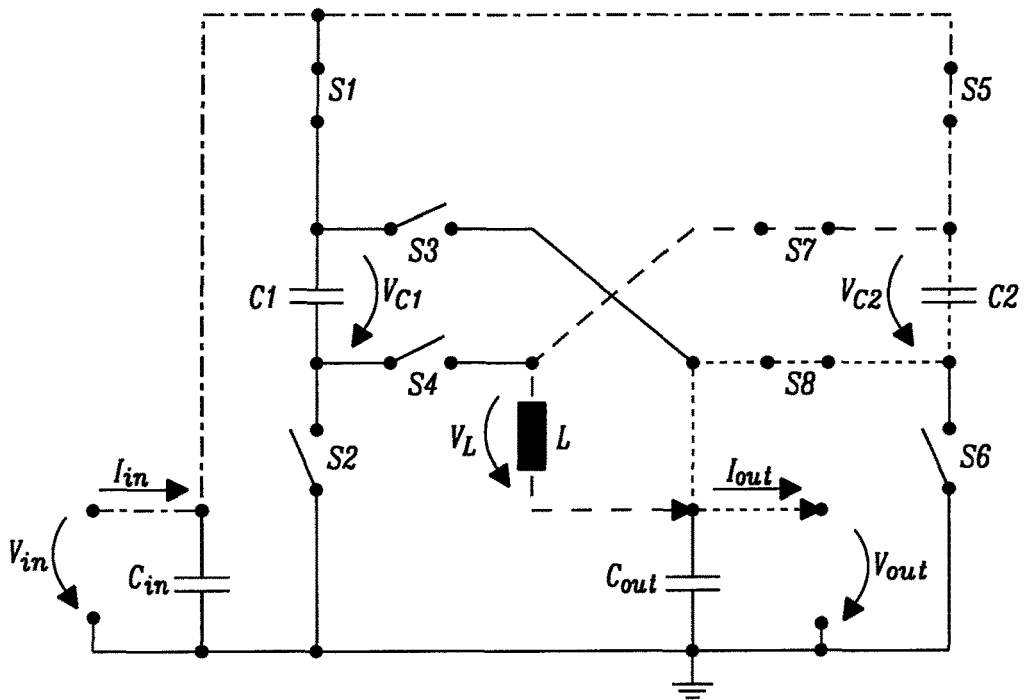
Figure 3E:
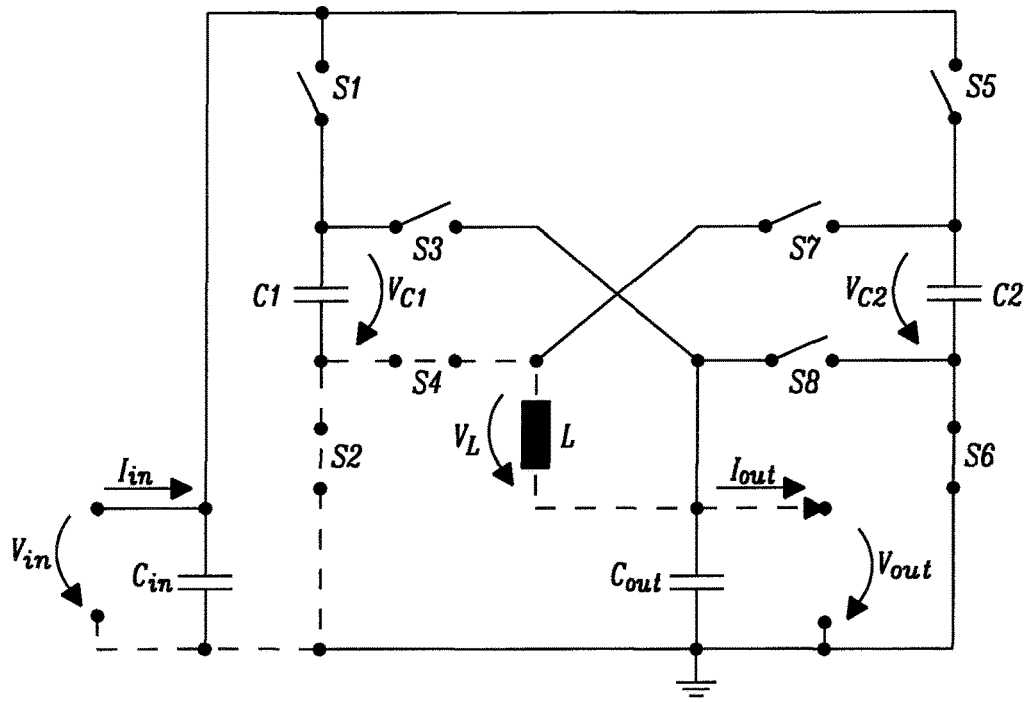
Figure 3F:
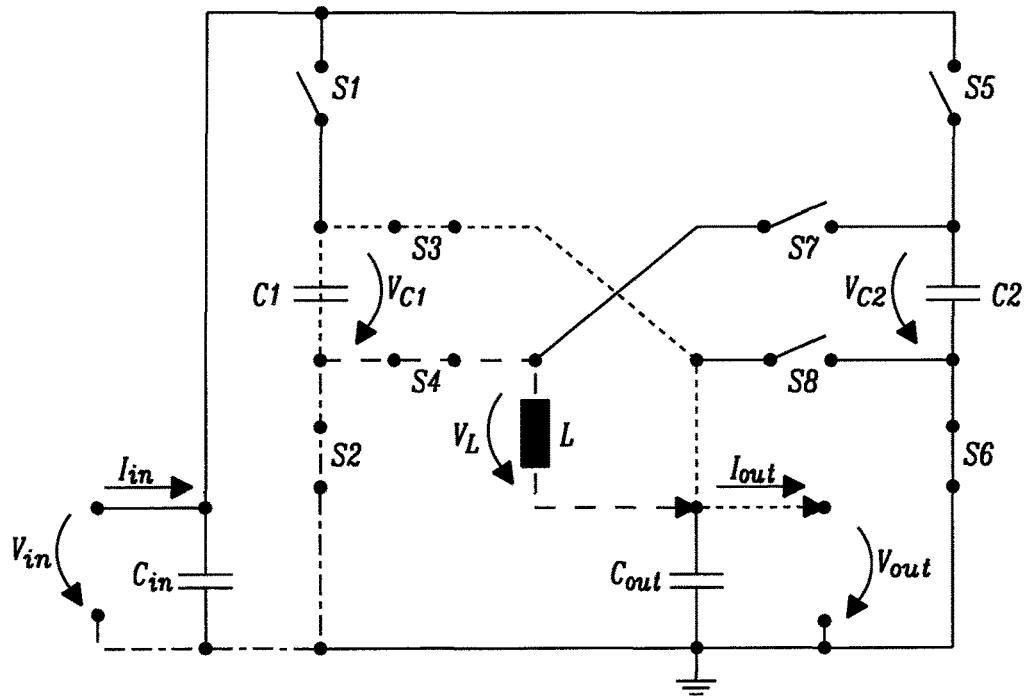

The above mentioned operation states should be viewed as examples. Other operation states may be used (alternatively or in addition) e.g. to reduce the input current ripple. This may be achieved, e.g. by flipping or exchanging in FIG. 3A and FIG. 3B either the state of the switches on the right side (S5 to S8) or on the left side (S1 to S4). The switches of the left side of FIG. 1A may be the switches of a first switching matrix and the switches on the right side of FIG. 1A may be the switches of a second switching matrix. Furthermore, variants of the third operation state and of the fourth operation state are shown in FIGS. 3D and 3F, respectively. It can be seen that these variants represent combined bypass states and inductor states, as bypass current may be provided to the second converter port directly via C2 (FIG. 3D) or via C1 (FIG. 3F).

Figure 4A:
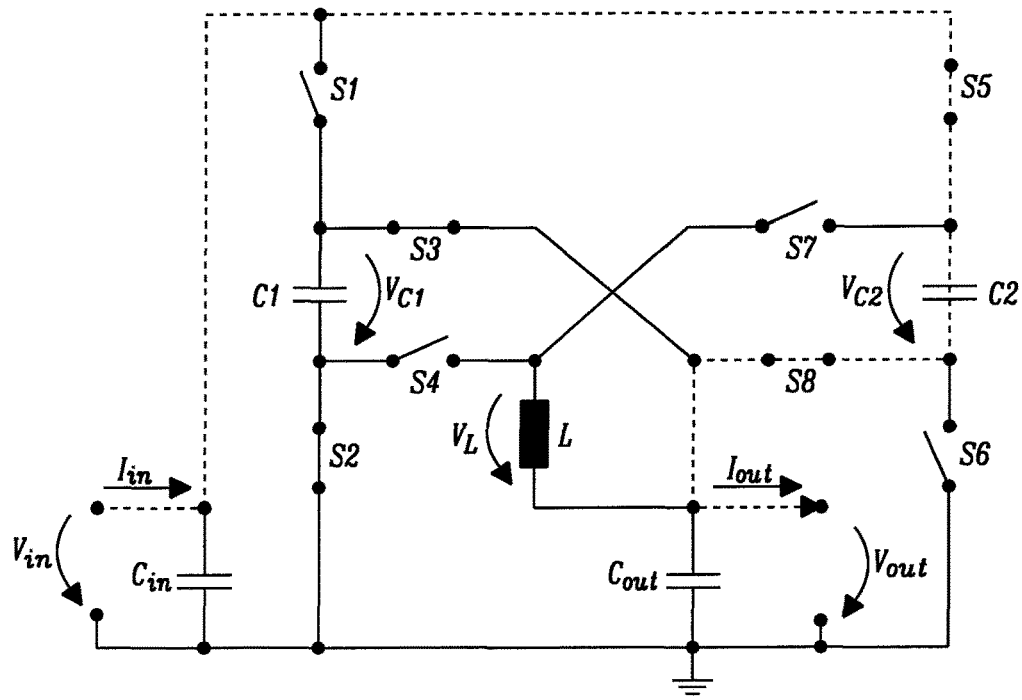
FIGS. 4A, 4B, 4C, 4D show different operation states of the power converter of FIG. 1A at light loads.
Figure 4B:
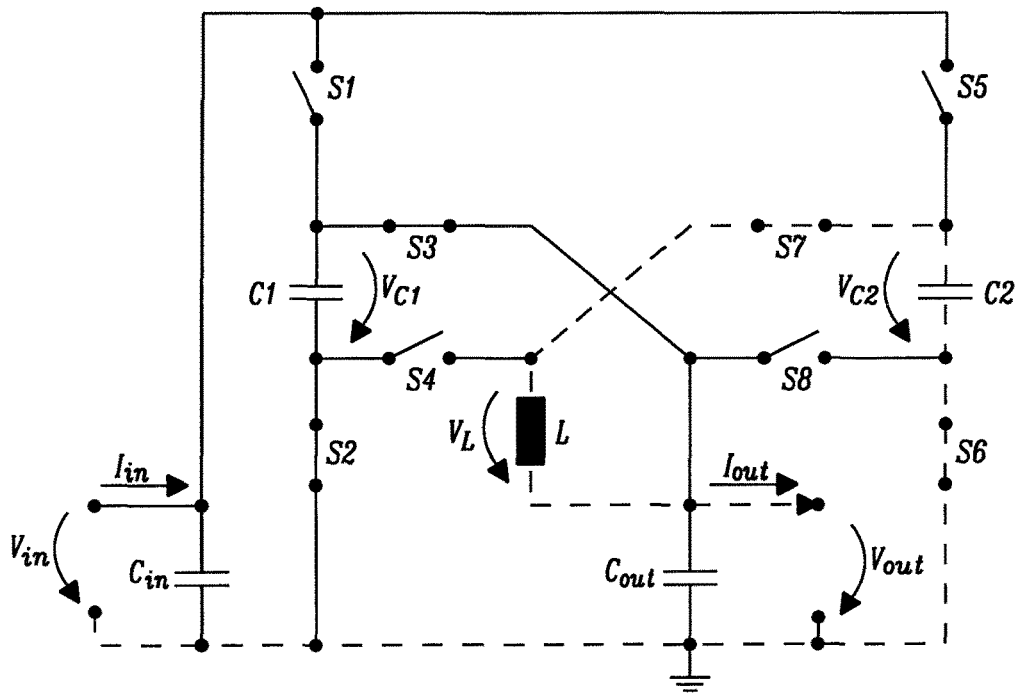

As long as the conversion ratio of the power converter of FIG. 1A is close to 2:1 a light load mode with reduced switching loss may be implemented as illustrated in FIGS. 4A to 4D. Half of the switches (e.g. the switches S1, S2, S3 and S4) may be frozen to a steady state, thereby reducing switching losses. The operation state of FIG. 4A may be used to charge the flying capacitor C2 and the operation state of FIG. 4B may be used to discharge the flying capacitor C2 (via the inductor L). The operation state of FIG. 4A is a pure bypass state, and the operation state of FIG. 4B is a pure inductor state.

Figure 4C:
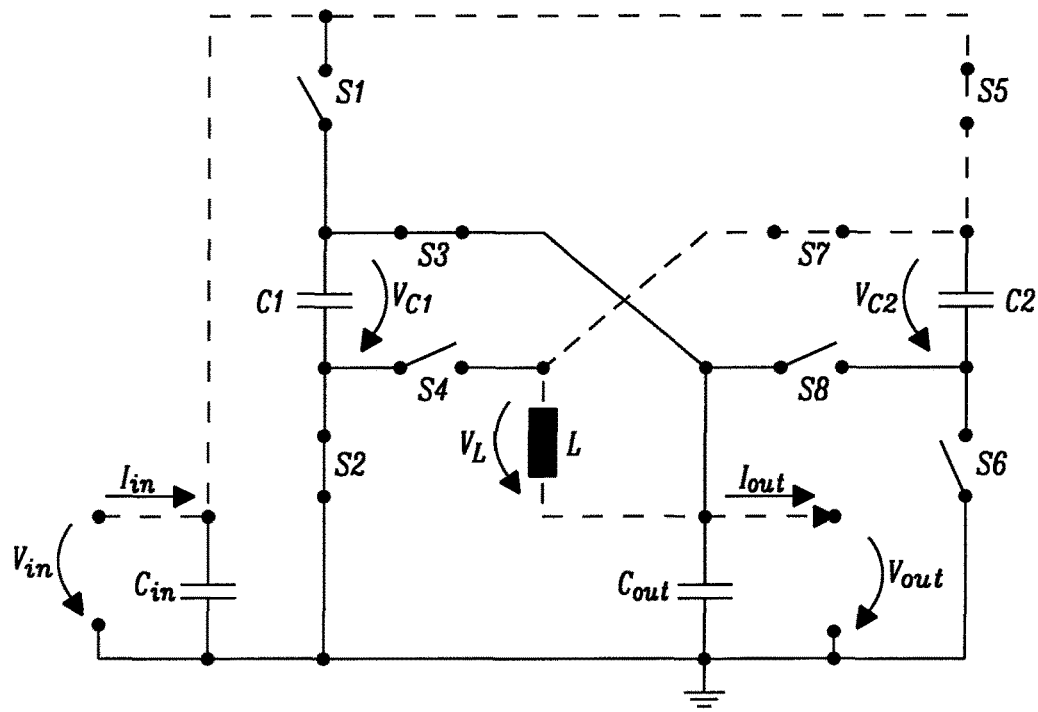
Figure 4D:
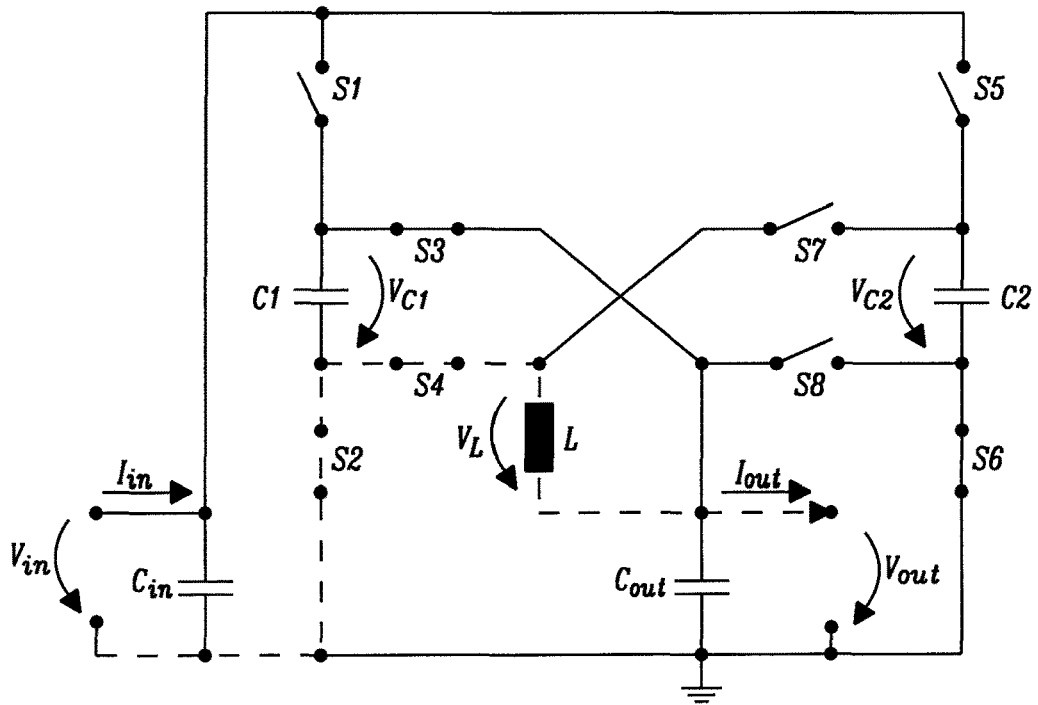

The operation states of FIGS. 4A and 4B may be toggled in case of (unregulated) 2:1 conversion. That is, in case of (unregulated) 2:1 conversion the states from FIGS. 4C and 4D may be skipped. A state according to FIG. 4C may be inserted when Vout>Vin/2. The state from FIG. 4D may be inserted when Vout<Vin/2. The operation states of FIGS. 4C and 4D are pure inductor states.

With switches S1, S2 and S3 being static and S4 being static for $V_{out}/V_{in}<2:1$, only up to 50% of the switches are toggling their state during a full cycle. This reduces the switching loss of the power converter. The duration of the state according to FIG. 4A may be extended for discontinuous switching at very light load.

Figure 1B:
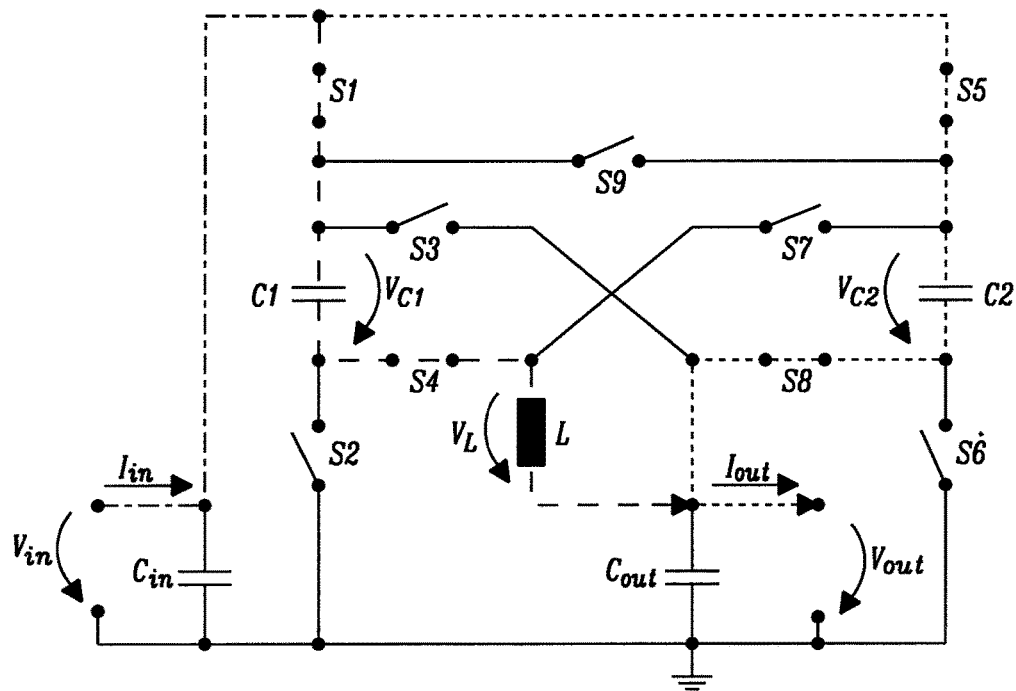
FIG. 1B illustrates an example power converter with an additional switch.
Figure 5A:
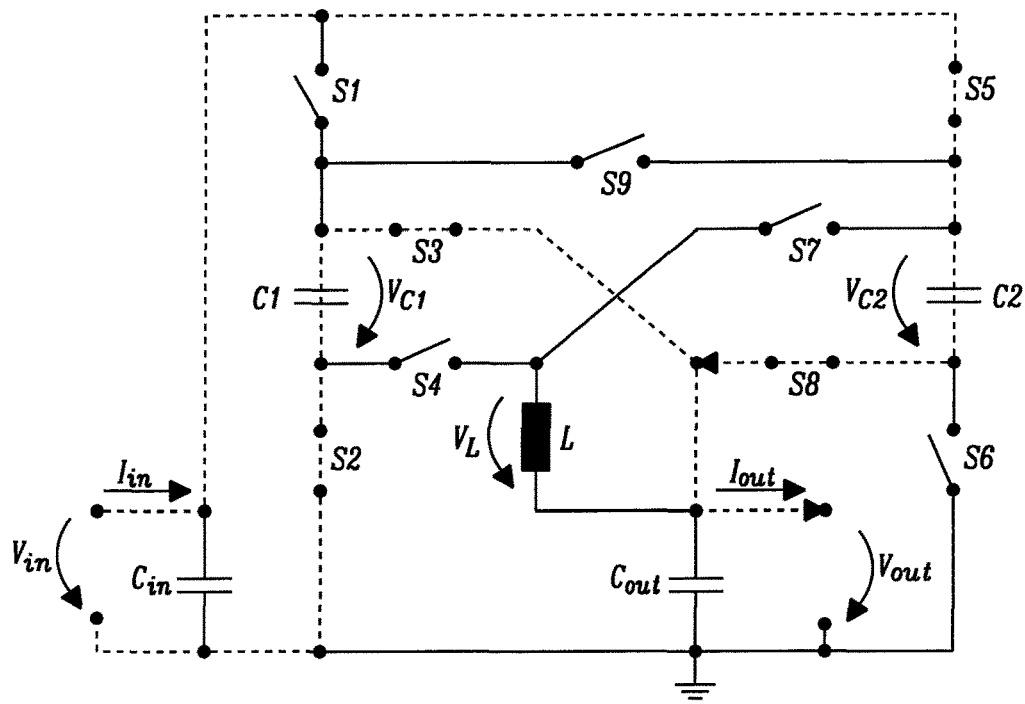
FIGS. 5A, 5B, 5C, 5D show different operation states of the power converter of FIG. 1B.
Figure 5B:
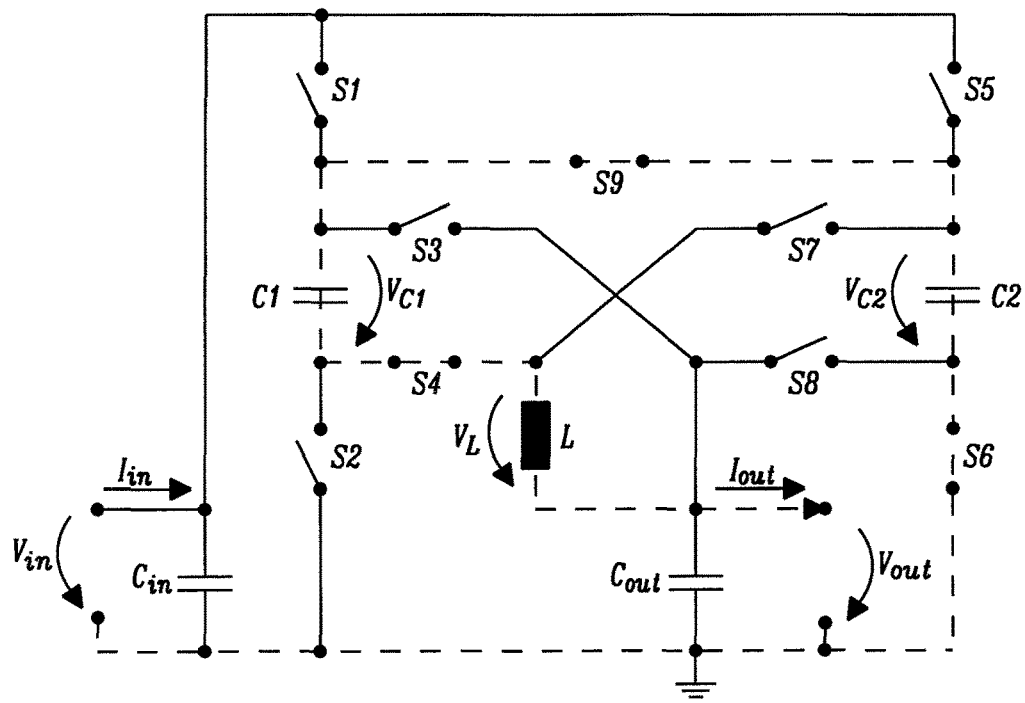
Figure 5C:
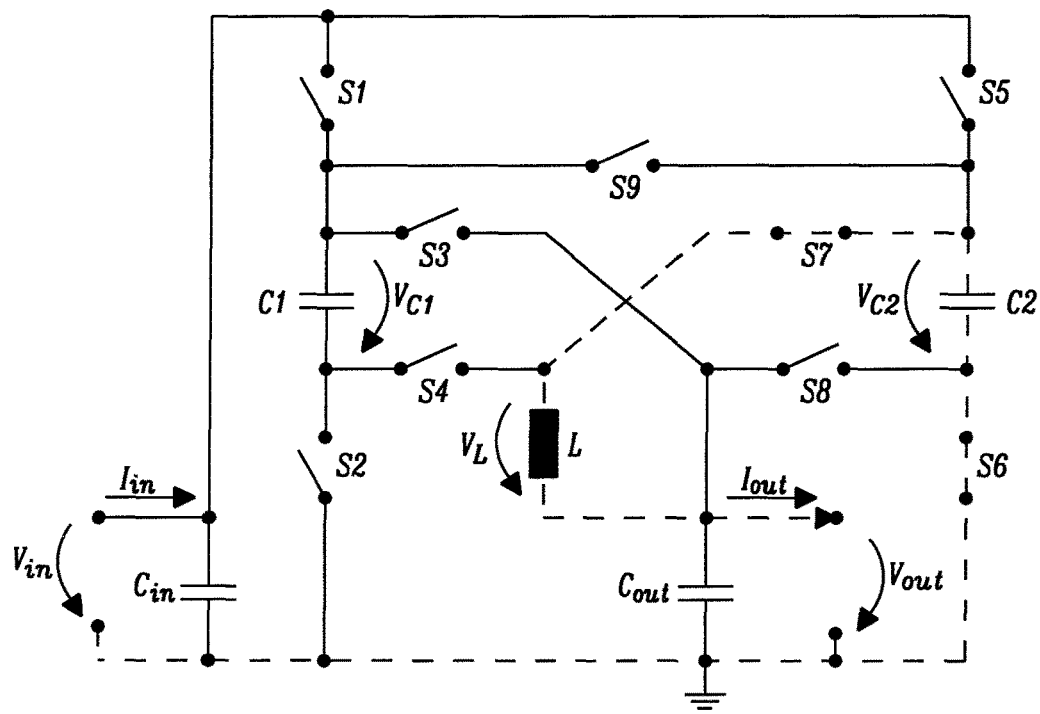
Figure 5D:
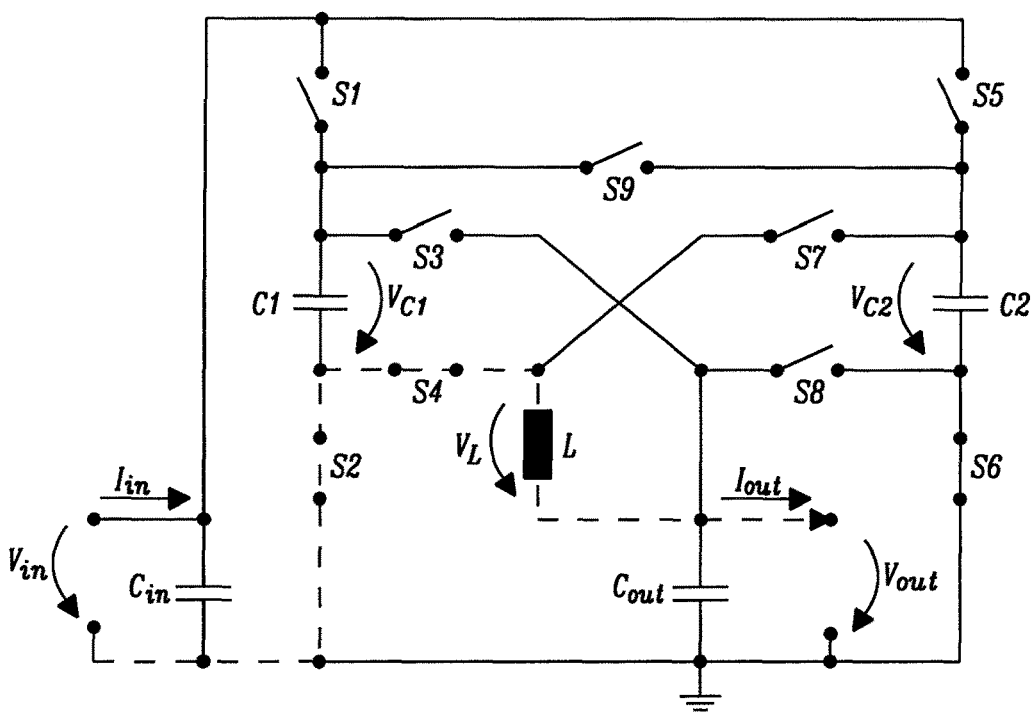

FIG. 1A shows a power converter which exhibits optimal power efficiency for conversion ratios in the range of 2:1. For a $V_{out}/V_{in}$ ratio closer to 3:1 than to 2:1 a variant of the power converter of FIG. 1A shown in FIG. 1B provides improved light load efficiency by adding an additional switch S9, which is configured to (directly) couple the first port of the first capacitor C1 with the first port of the second capacitor C2. FIGS. 5A to 5D show operation states which may be used to operate the power converter of FIG. 1B. The operation state of FIG. 5A is a pure bypass state providing current to the second converter port via the capacitors C1 and C2. On the other hand, the operation states of FIGS. 5B, 5C and 5D are pure inductor states.

The operation states of FIGS. 5A and 5B may be toggled in case of an (unregulated) conversion ratio 3:1. The rules for the states according to FIG. 5C and FIG. 5D apply similar to the previous light load schemes for the power converter of FIG. 1A, i.e. the state of FIG. 5C may be used for $V_{out}/V_{in}>\frac{1}{3}$, and the state of FIG. 5D may be used for $V_{out}/V_{in}<\frac{1}{3}$. The state according to FIG. 5C may be replaced with the state shown in FIG. 4C. The duration of the state according to FIG. 5A may be extended for discontinuous switching at very light load.

The main difference compared with the previous light load scheme is the state according to FIG. 5B, where the second capacitor C2 discharges via the first capacitor C1 that is connected in series with the inductor L and the output capacitor $C_{out}$, generating a voltage across the inductor L of $V_{in}-3\times V_{out}$ (thereby resulting in an inherent capacitive 3:1 voltage divider).

In order to support both conversion ratios ($V_{in}/V_{out}>0.5$ and $V_{in}/V_{out}<0.5$) the switch S9 may be implemented as a back-to-back device. The power converter of FIG. 1B may use a non-back-to back device for the switch S9 in case $(2\times V_{out}-V_{in})<V_{th}$ (i.e. the threshold voltage) of the body diode of the switch S9 and if S1 is only closed when S5 is closed in parallel. Alternatively the cycle of operation states is adapted in a way so that the voltage of capacitors C1 and C2 stabilizes at a voltage level close to $V_{out}$.

Figure 6A:
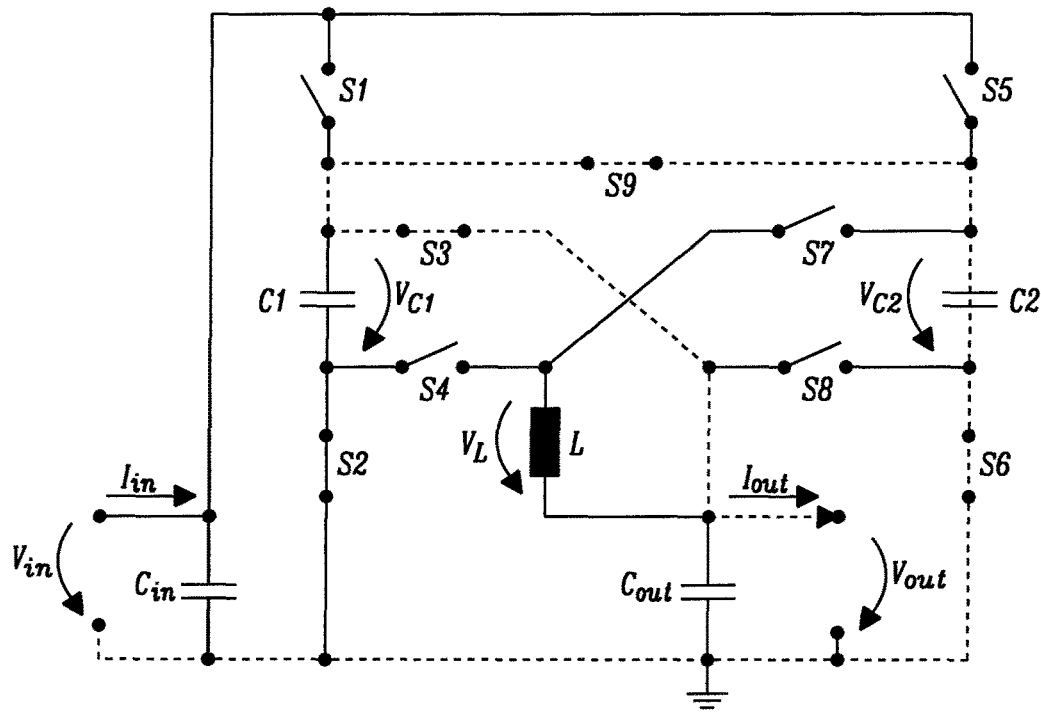
FIGS. 6A and 6B show different operation states of the power converter of FIG. 1B at light loads.
Figure 6B:
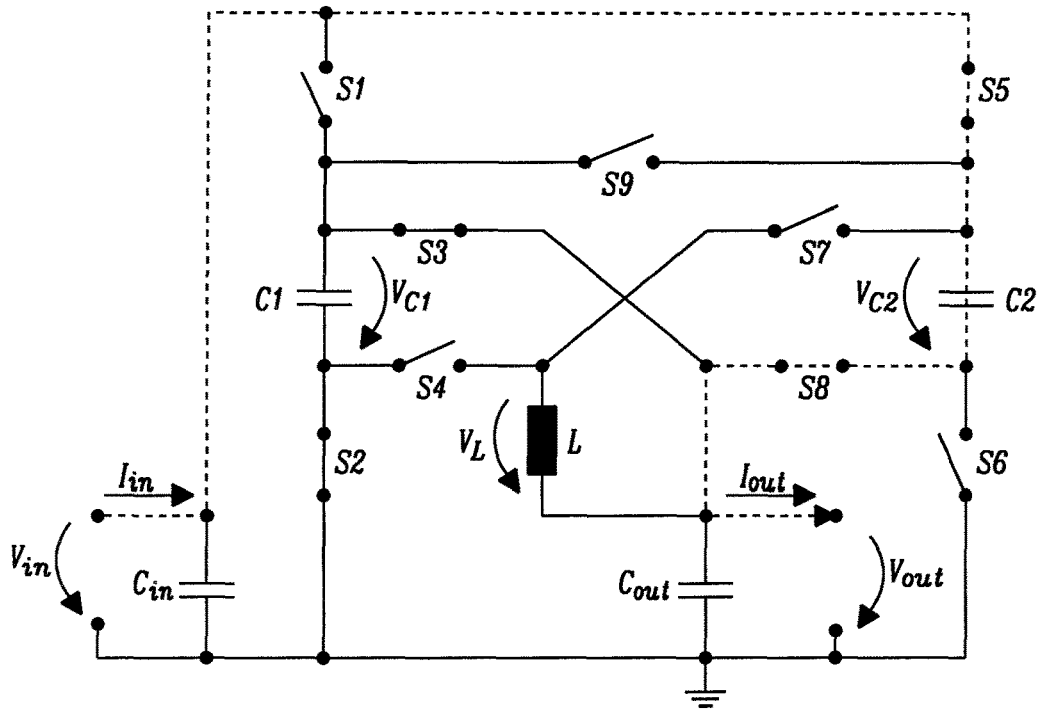

The additional switch S9 enables an additional light load scheme, by removing inductor core loss completely during an unregulated 2:1 conversion. This is illustrated in the operation states of FIGS. 6A and 6B, which may be toggled periodically. With the switches S1, S2, S3, S4 and S7 being static, the converter switching losses may be reduced to less than 50%.

Figure 1C:
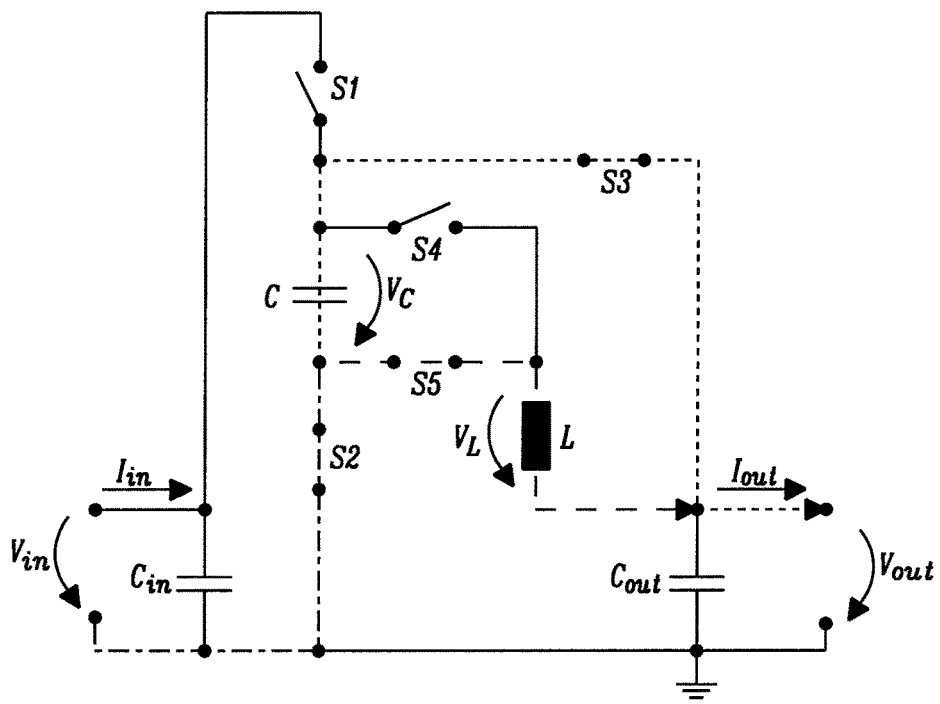
FIG. 1C shows an example power converter with a single capacitor network.
Figure 1D:
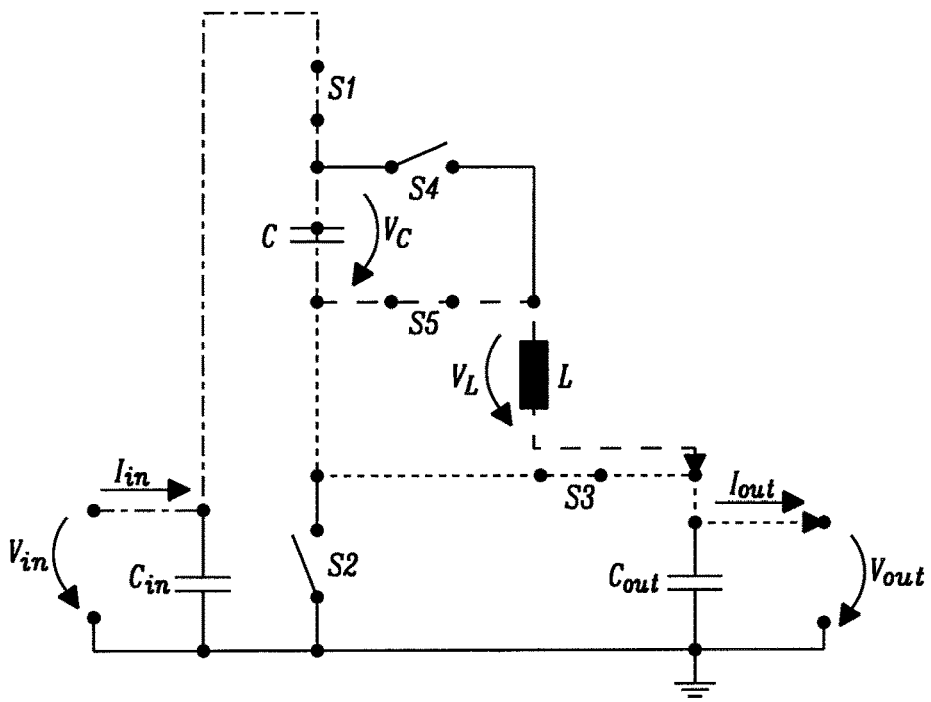
FIG. 1D shows an example power converter with a single capacitor network.

FIGS. 1C and 1D show power converters which are capable of providing increased output currents and which are capable of increasing power efficiency at relatively light loads. The power converter of FIG. 1CB may be used to provide a maximum output current of up to 1.5 times the inductor current limit (compared to two times the inductor current limit provided by the power converter of FIG. 1). In case of $V_{out}/V_{in} > \frac{1}{2}$, the switch S5 should be implemented in a back-to-back configuration (with blocking body diodes). The same back-to-back configuration should be used when implementing regulation during rising transient load current.

The power converter of FIG. 1C comprises a single flying capacitor C, wherein a first port of the capacitor C may be (directly) coupled to the input port using a switch S1. Furthermore, the first port of the capacitor C may be (directly) coupled to a first port of the inductor L using a switch S4. A second port of the capacitor C may be (directly) coupled to the first port of the inductor L using a switch S5 and may be (directly) coupled to ground using a switch 2. A second port of the inductor L is (directly) coupled to the output port. Furthermore, a switch S3 (comparable to S3 in FIG. 1A) may be used to directly couple the first port of the capacitor C to the output port. FIG. 1C shows a combined bypass state and inductor state of the power converter. In particular, during the operation state shown in FIG. 1C current may be provided directly to the second converter port via the capacitor C (bypass state). Furthermore, current may be provided to the second converter port via the inductor L (inductor state).

The first operation state shown in FIG. 1C may be used to discharge the capacitor (and possibly demagnetize the inductor L). In a second operation state, S2 and S4 may be closed (with the other switches being open) to discharge C through the inductor L. In a further operation state, S2 and S3 may be closed (with the other switches being open) to discharge C. In a further operation state, S2 and S5 may be closed (with the other switches being open) to demagnetize L. Furthermore, an operation state for charging the capacitor C should be provided, e.g. by closing the switches S1 and S5. Using these operation states, a regulated conversion ratio of up to 2:1 may be achieved with an increased maximum output current.

The power converter from FIG. 1D connects the left side of switch S3 to the second port of the capacitor C. By that the capacitor voltage across the capacitor C may converge towards $V_{in}-V_{out}$. The benefit of this variant is reduced voltage rating for switches S2 and S3. FIG. 1D shows a combined bypass state and inductor state of the power converter. In particular, during the operation state shown in FIG. 1D current may be provided directly to the second converter port via the capacitor C (bypass state).

Furthermore, current may be provided to the second converter port via the inductor L (inductor state).

Figure 1E:
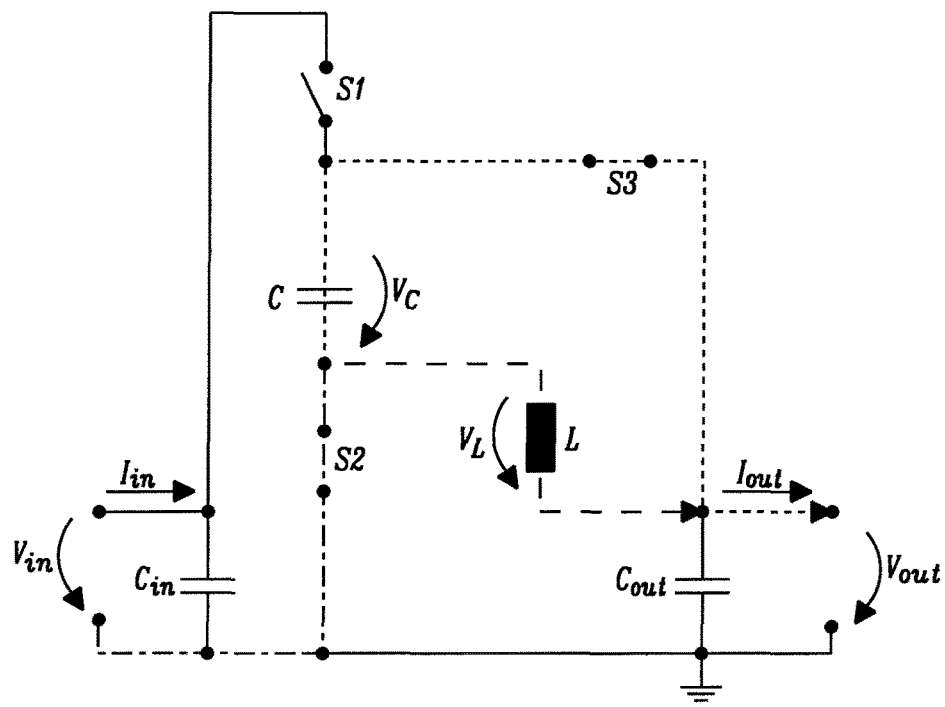
FIG. 1E shows an example power converter with a single capacitor network and a reduced number of switches
Figure 1F:
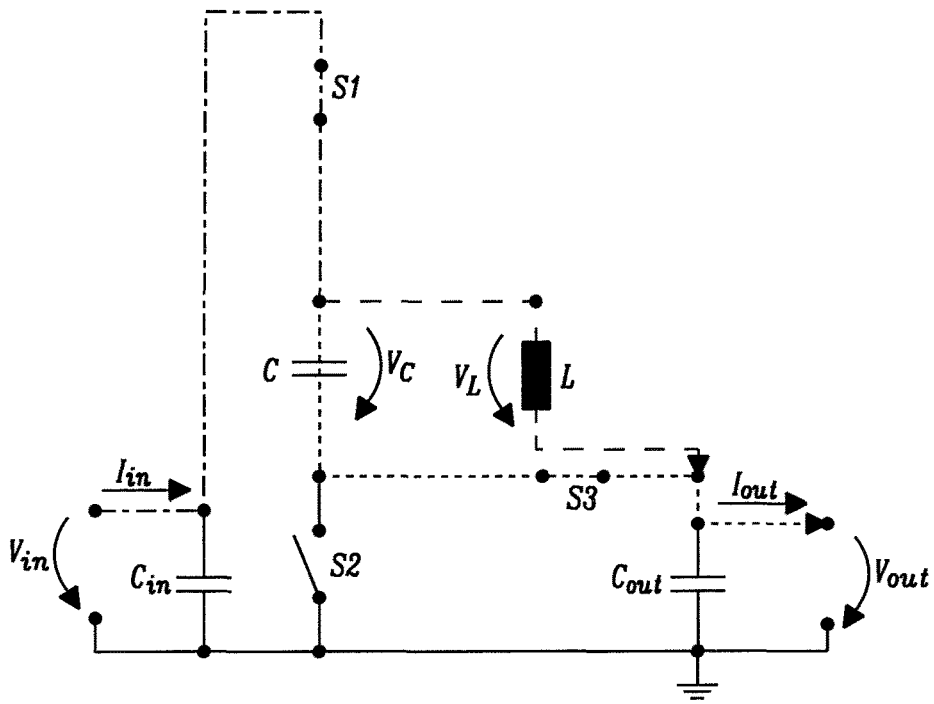
FIG. 1F shows an example power converter with a single capacitor network and a reduced number of switches.
Figure 1G:
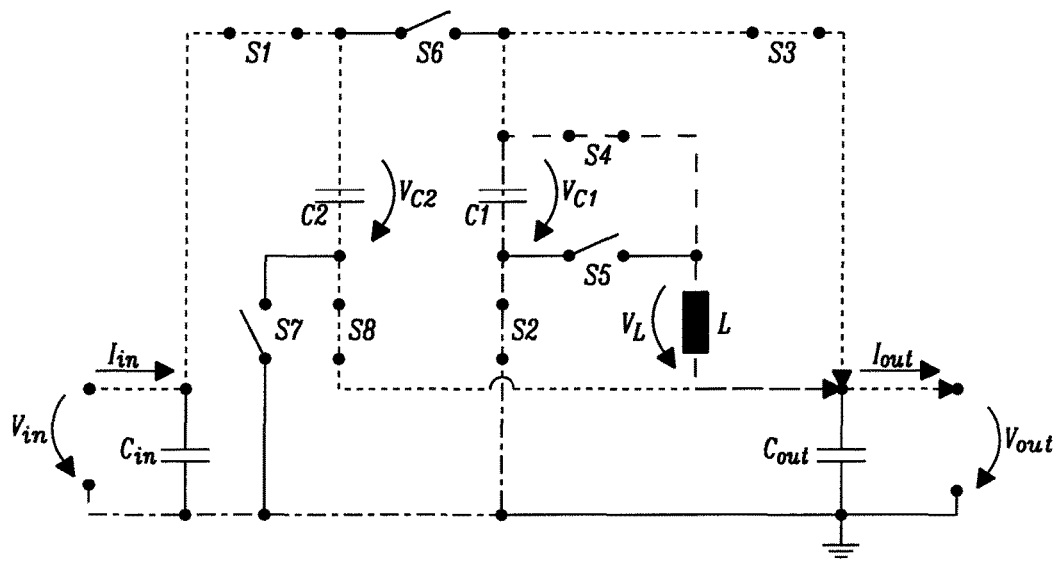
FIG. 1G shows an example power converter with two capacitor networks and improved light load efficiency for $V_{out}/V_{in} \sim 1/3$.
Figure 1H:
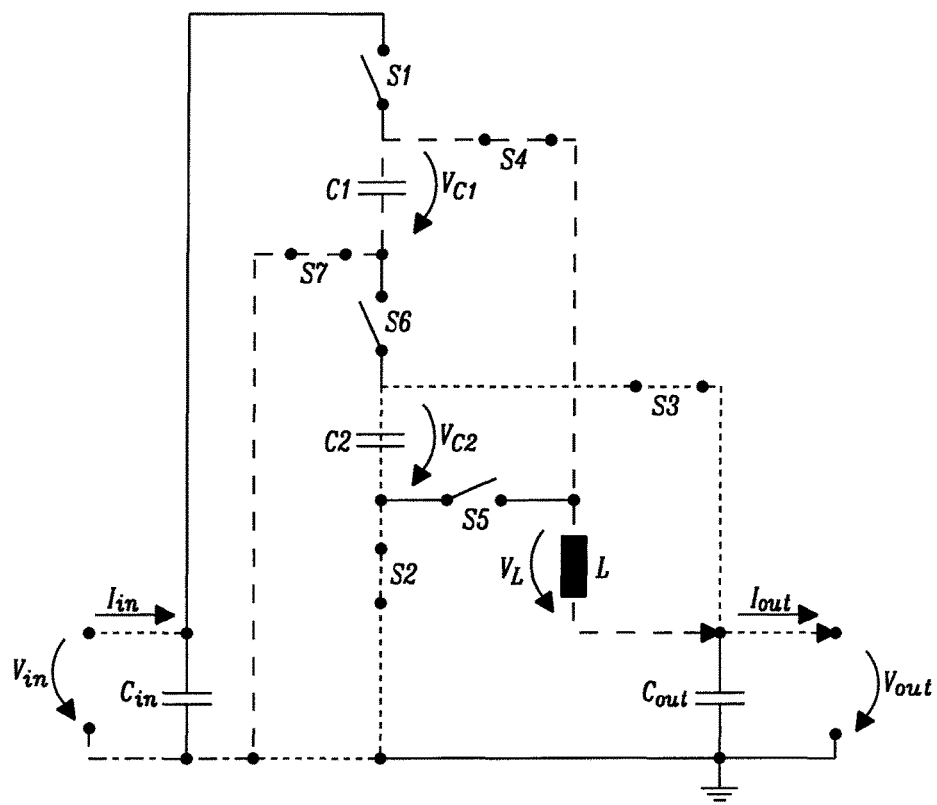
FIG. 1H shows an example power converter with two capacitor networks and improved light load efficiency for $V_{out}/V_{in} \sim 1/3$.
Figure 1I:
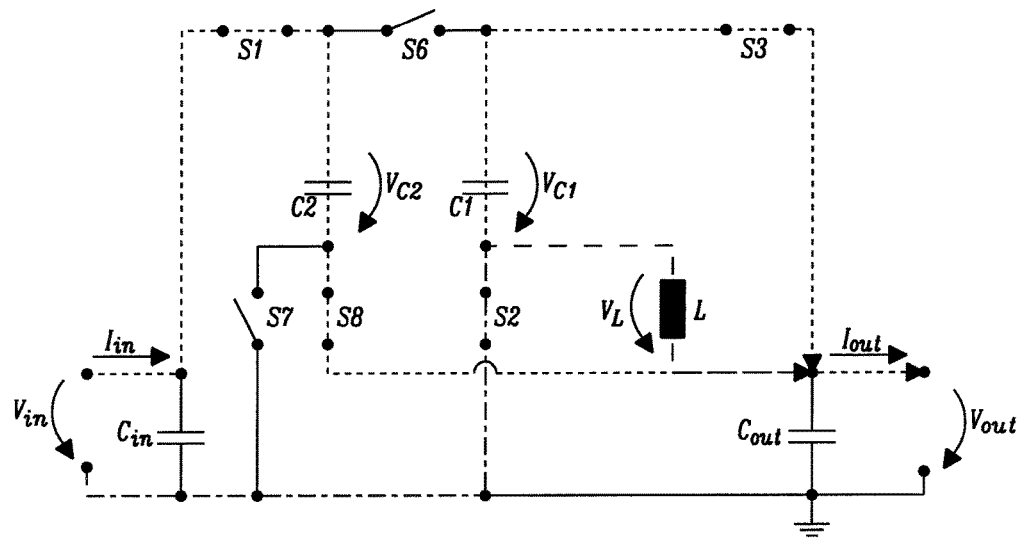
FIG. 1I shows an example power converter with two capacitor networks.
Figure 1J:
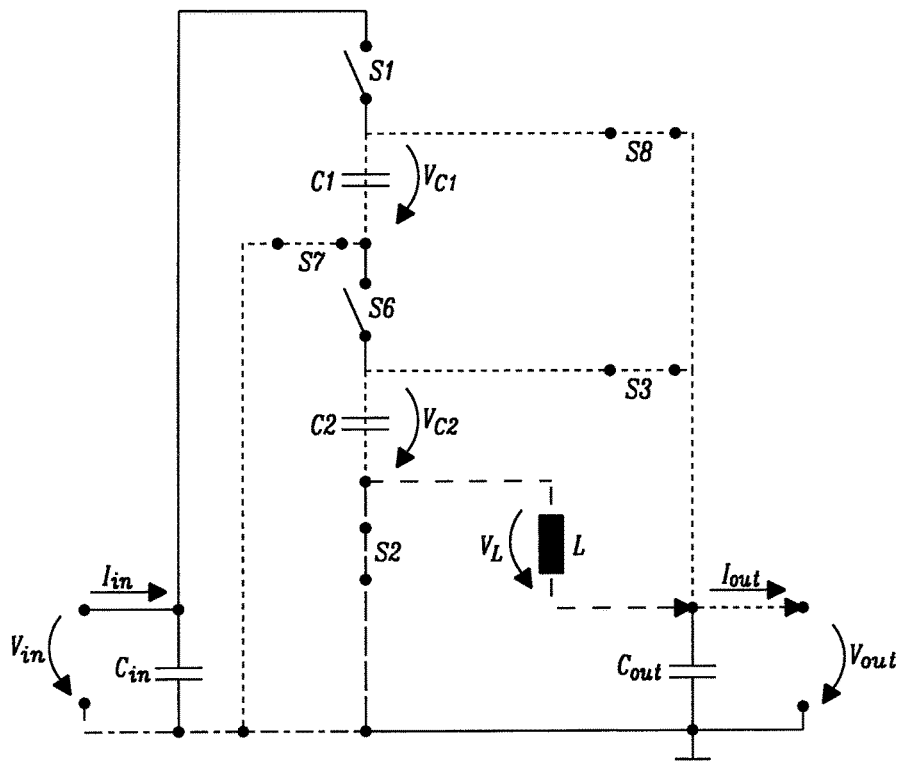
FIG. 1J shows an example power converter with two capacitor networks.
Figure 1K:
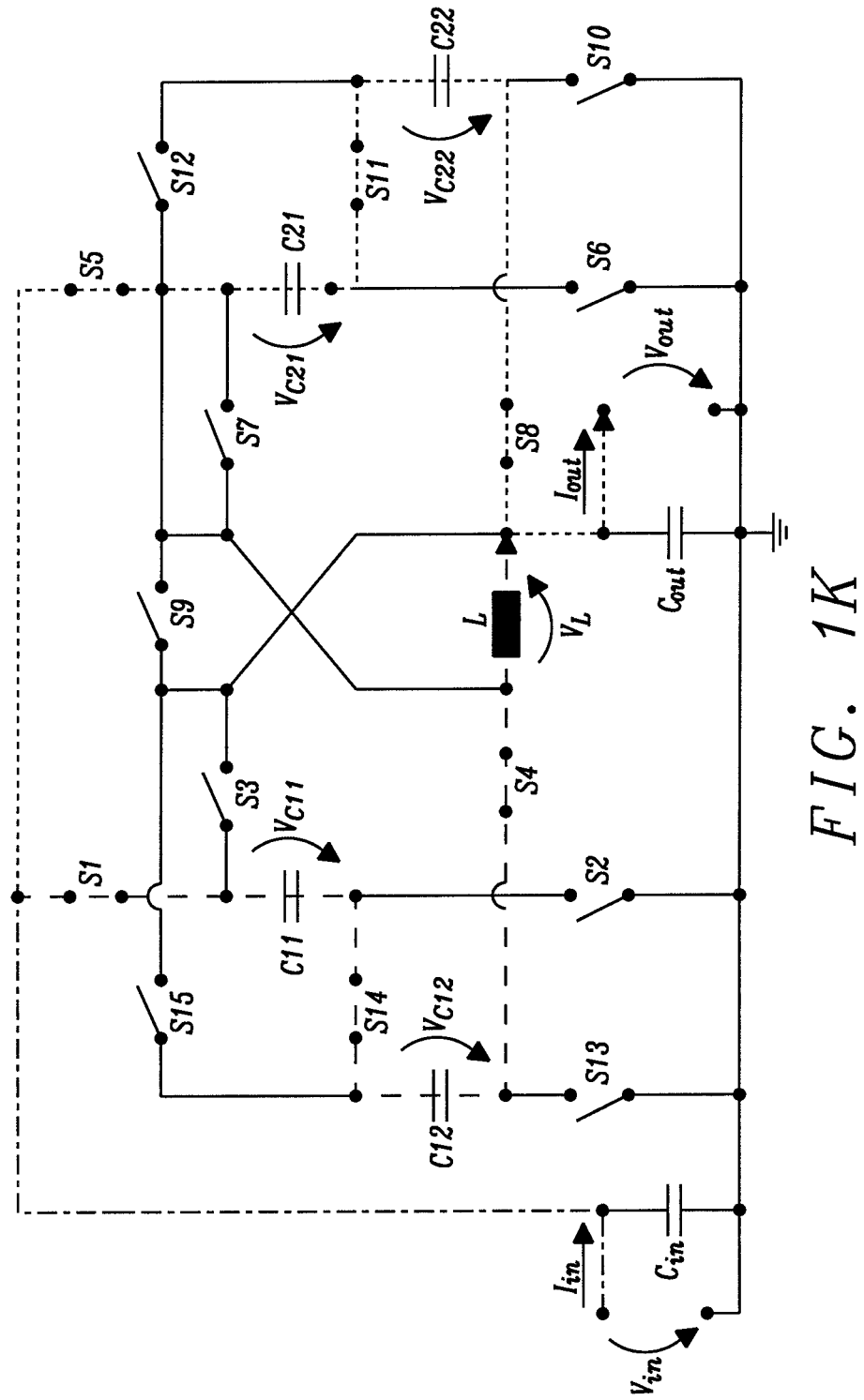
FIG. 1K shows an example power converter with capacitor networks comprising a plurality of capacitors.
Figure 1L:
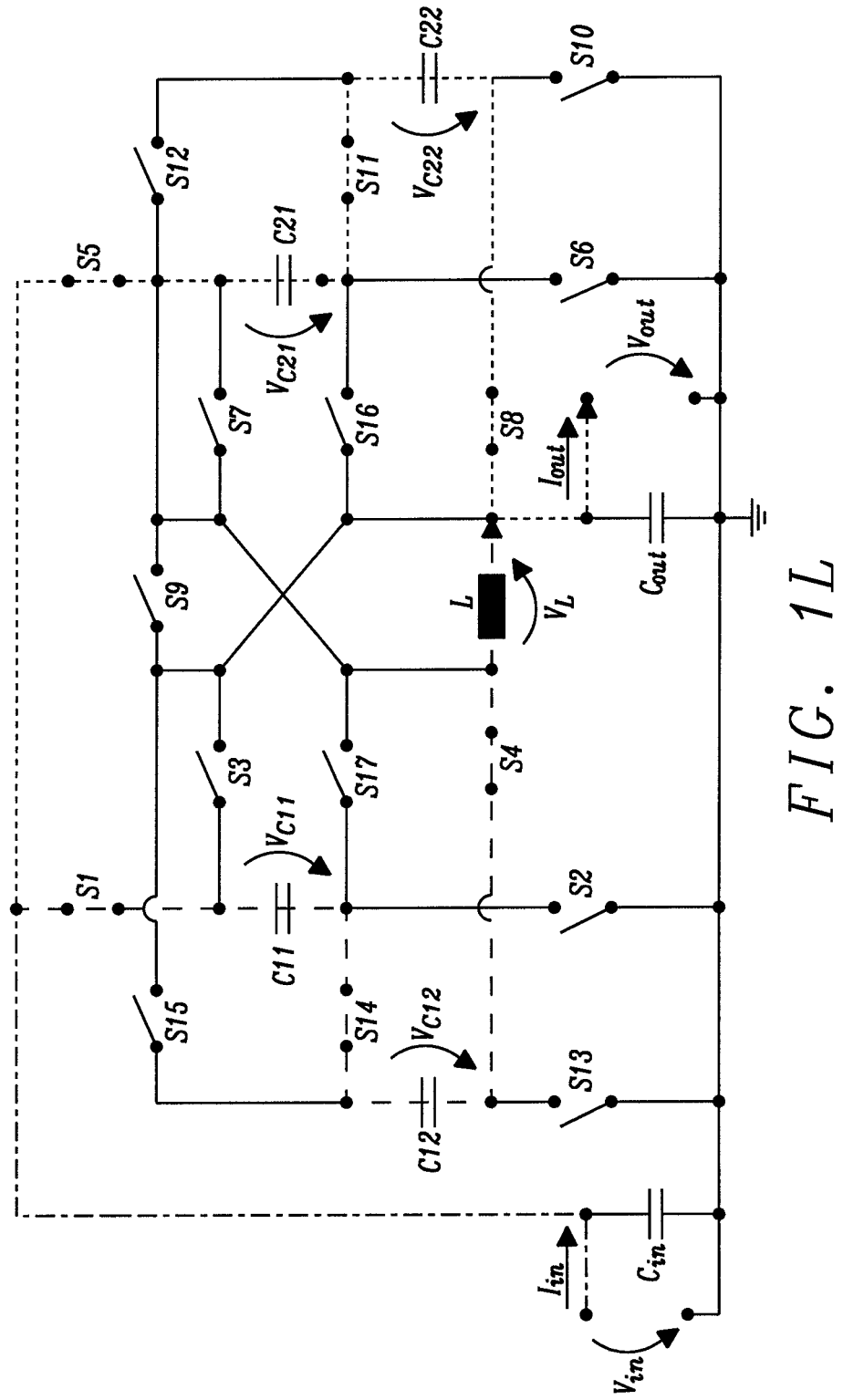
FIG. 1L shows another example power converter with capacitor networks comprising a plurality of capacitors.
Figures 1M, 2:
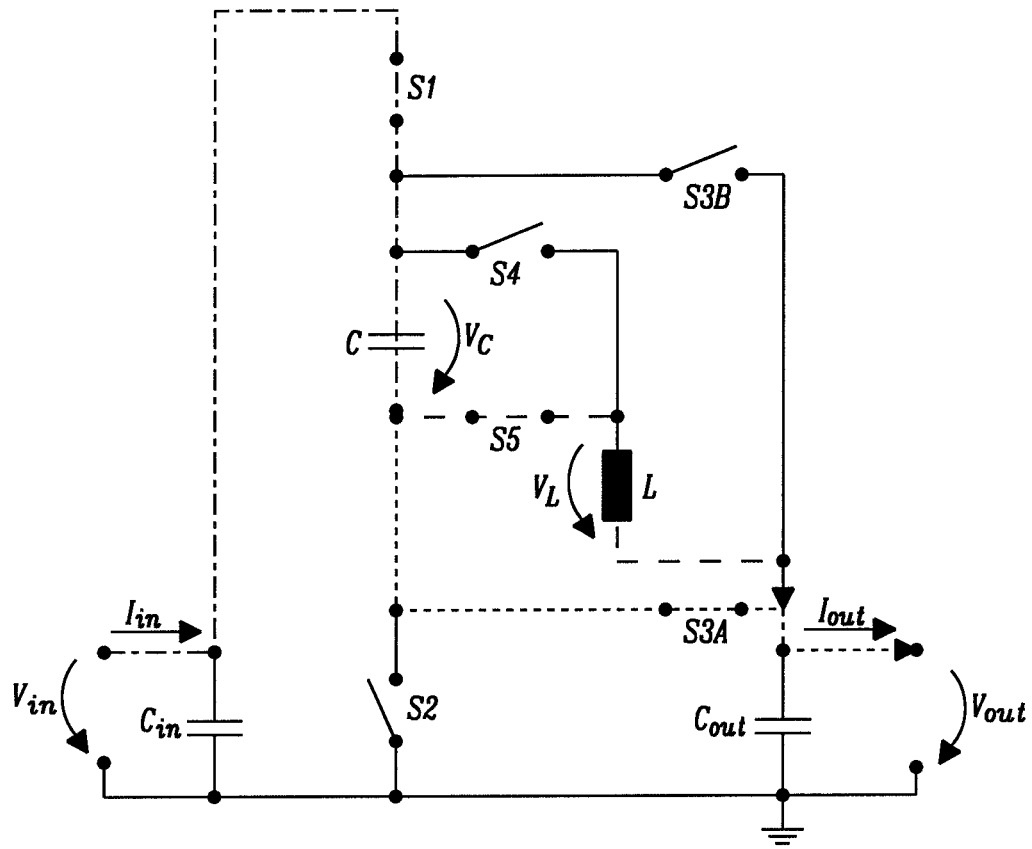
FIG. 1M shows another example power converter being a combination of the converters from FIGS. 1C and 1D.
FIG. 2 shows a flow chart of a method for controlling a power converter.

As shown in FIG. 1M the switches S3A and S3B, which correspond to the switches S3 from the power converters of FIGS. 1C and 1D may be combined within a single power converter implementing the conversion capabilities for both (high and low) conversion ratio ranges.

FIG. 1E illustrates a further simplified power converter which is configured to provide an increased maximum output current at up to 1.3 times the inductor current limit. This may be achieved by closing either switch S1 or switch S2 in combination with switch S3. In comparison to a standard buck converter the power converter of FIG. 1E only comprises one additional capacitor and one additional switch S3. The maximum conversion ratio $V_{out}/V_{in}$ is typically less than $\frac{1}{2}$ (realistically not higher than $\sim\frac{1}{3}$). Furthermore, the minimum inductor current ripple of the power converter of FIG. 1E is relatively high (compared to the power converters of FIG. 1A to FIG. 1D). In addition, the (light load) efficiency of the power converter of FIG. 1E is reduced compared to the power converters of FIGS. 1A, to 1D. FIG. 1E shows a combined bypass state and inductor state of the power converter. In particular, during the operation state shown in FIG. 1E current may be provided directly to the second converter port via the capacitor C (bypass state). Furthermore, current may be provided to the second converter port via the inductor L (inductor state).

FIG. 1F illustrates a similar (step-down) power converter as FIG. 1E, but with a minimum conversion ratio $V_{out}/V_{in}$ which is typically larger than $\frac{1}{2}$ (realistically not less than $\sim\frac{2}{3}$). The power converter of FIG. 1E comprises a switch S3 which is configured to couple the second port of the capacitor C (directly) with the second converter port. FIG. 1F shows a combined bypass state and inductor state of the power converter. In particular, during the operation state shown in FIG. 1F current may be provided directly to the second converter port via the capacitor C (bypass state). Furthermore, current may be provided to the second converter port via the inductor L (inductor state).

With an additional sixth switch in comparison to the power converters of FIG. 1C and FIG. 1D the power converter shown in FIG. 1G shifts the operation of optimum light load efficiency from $V_{out}/V_{in}=\frac{1}{2}$ towards $\frac{1}{3}$. The voltage rating of the switches is reduced against $V_{in}$. FIG. 1G shows a combined bypass state and inductor state of the power converter. In particular, during the operation state shown in FIG. 1G current may be provided directly to the second converter port via the capacitors C1 and C2 (bypass state). Furthermore, current may be provided to the second converter port via the capacitor C1 and the inductor L (inductor state).

Similar light load efficiency is implemented in the power converter illustrated in FIG. 1H, but at improved high current efficiency. The voltage rating of the switches of the power converter of FIG. 1H is typically higher than that for the power converter of FIG. 1G. FIG. 1H shows a combined bypass state and inductor state of the power converter. In particular, during the operation state shown in FIG. 1H current may be provided directly to the second converter port via the capacitor C2 (bypass state). Furthermore, current may be provided to the second converter port via the capacitor C1 and the inductor L (inductor state).

Figure 7A:
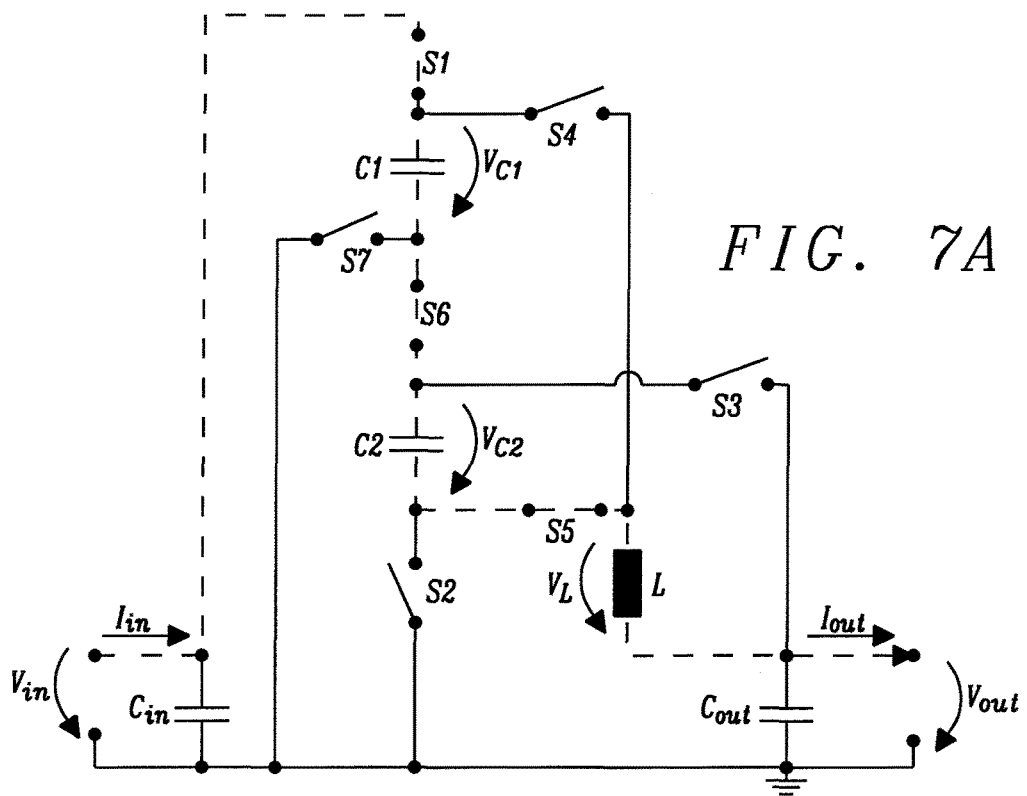
FIGS. 7A, 7B, 7C, 7D, 8A, 8B and 8C show different operation states of the power converter of FIG. 1H.
Figure 7B:
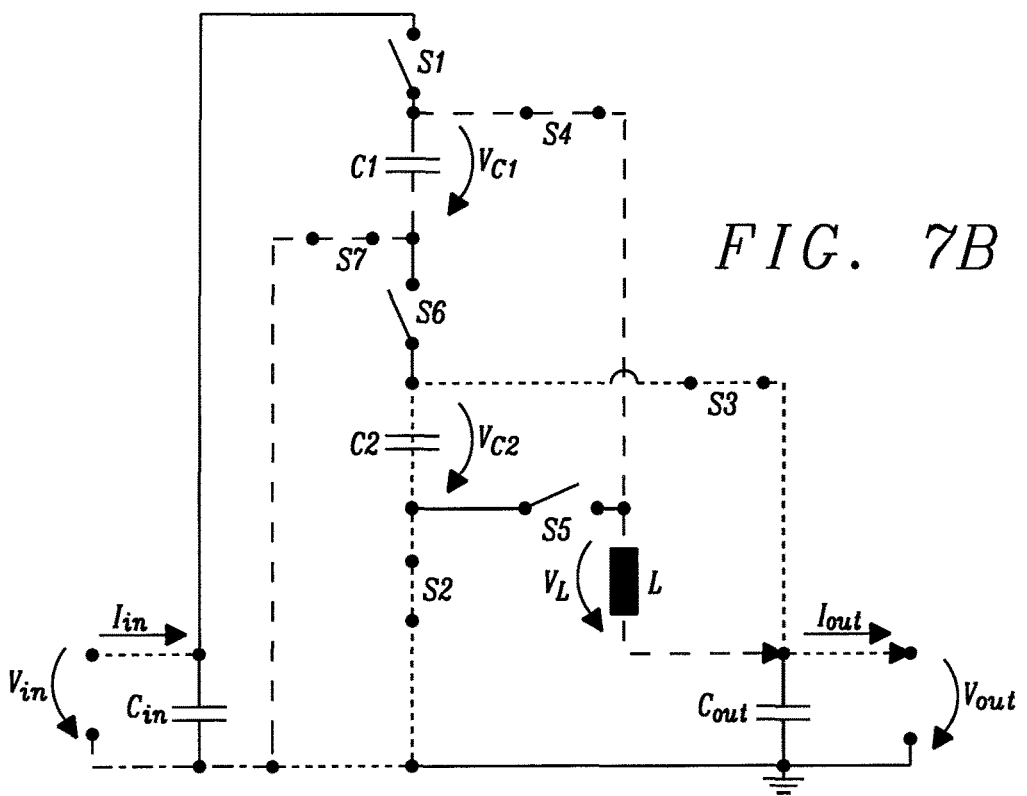
Figure 7C:
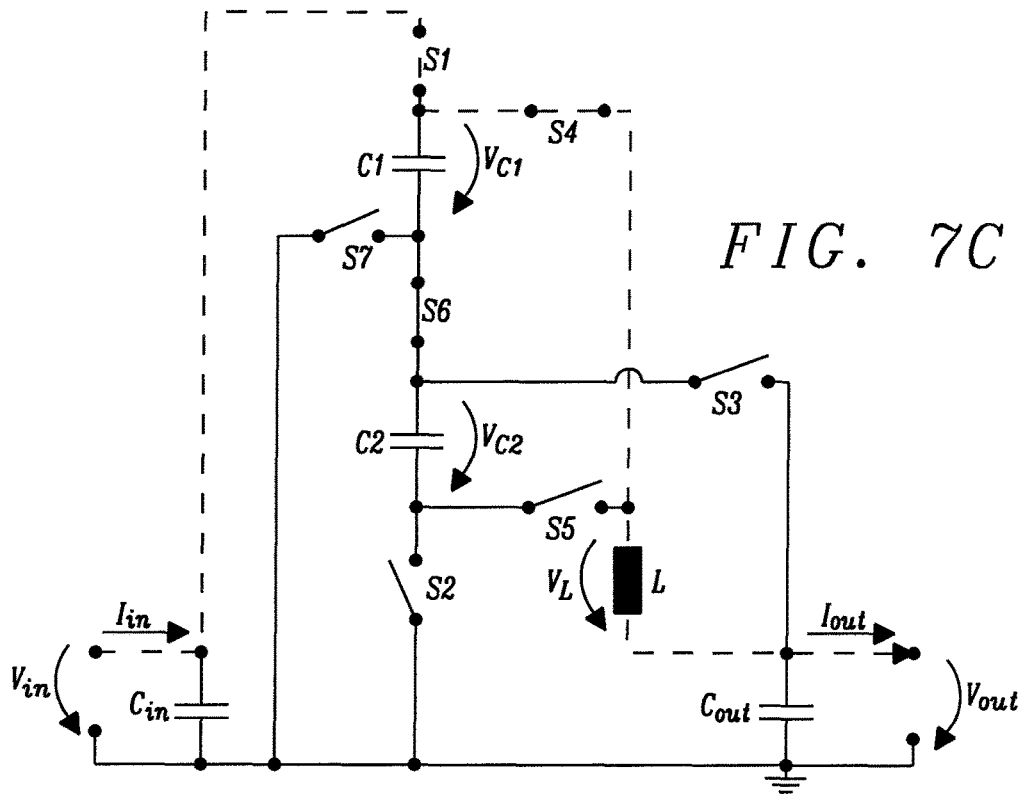
Figure 7D:
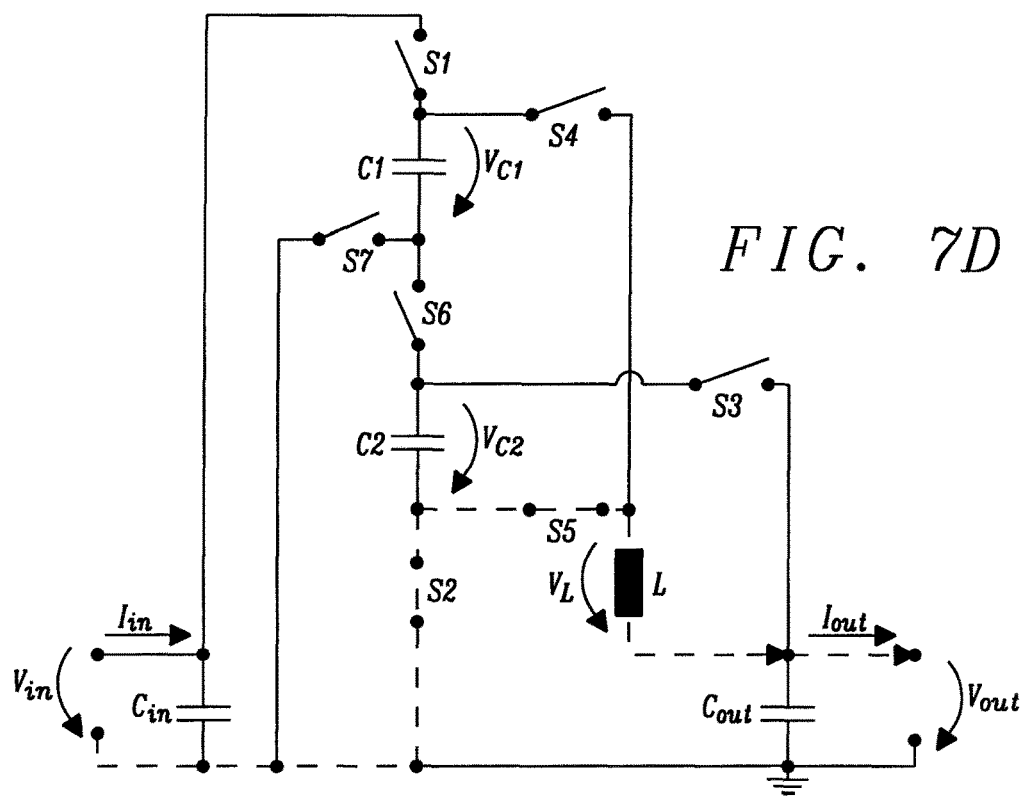
Figure 8A:
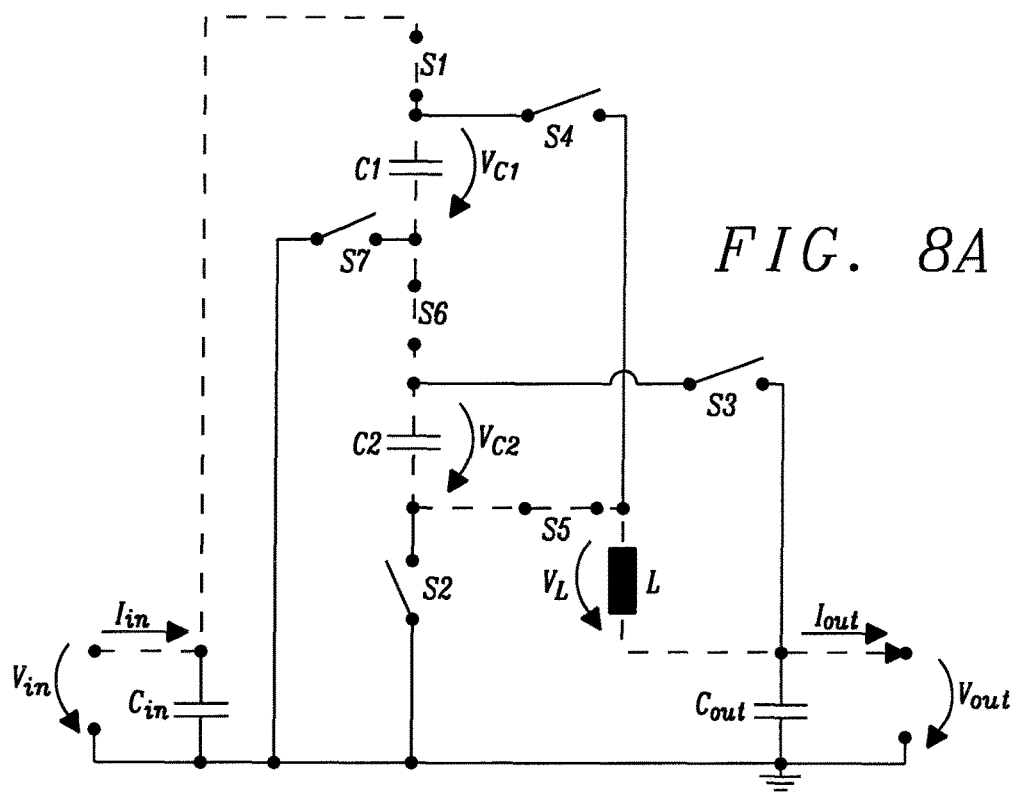
Figure 8B:
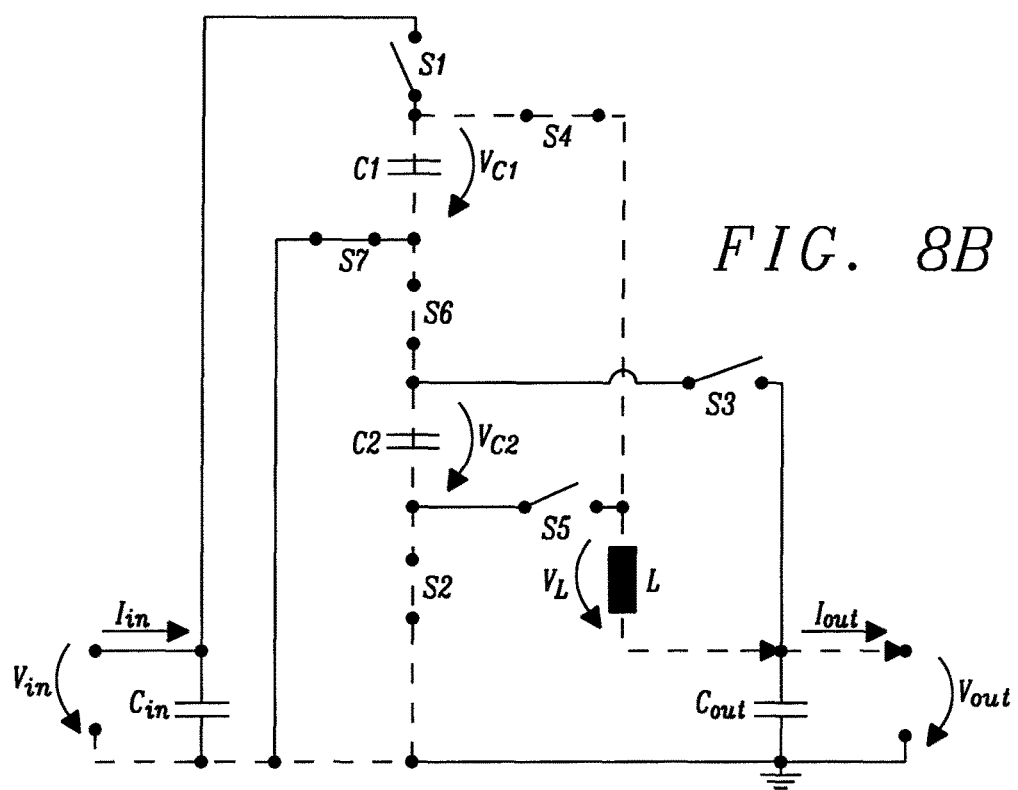
Figure 8C:
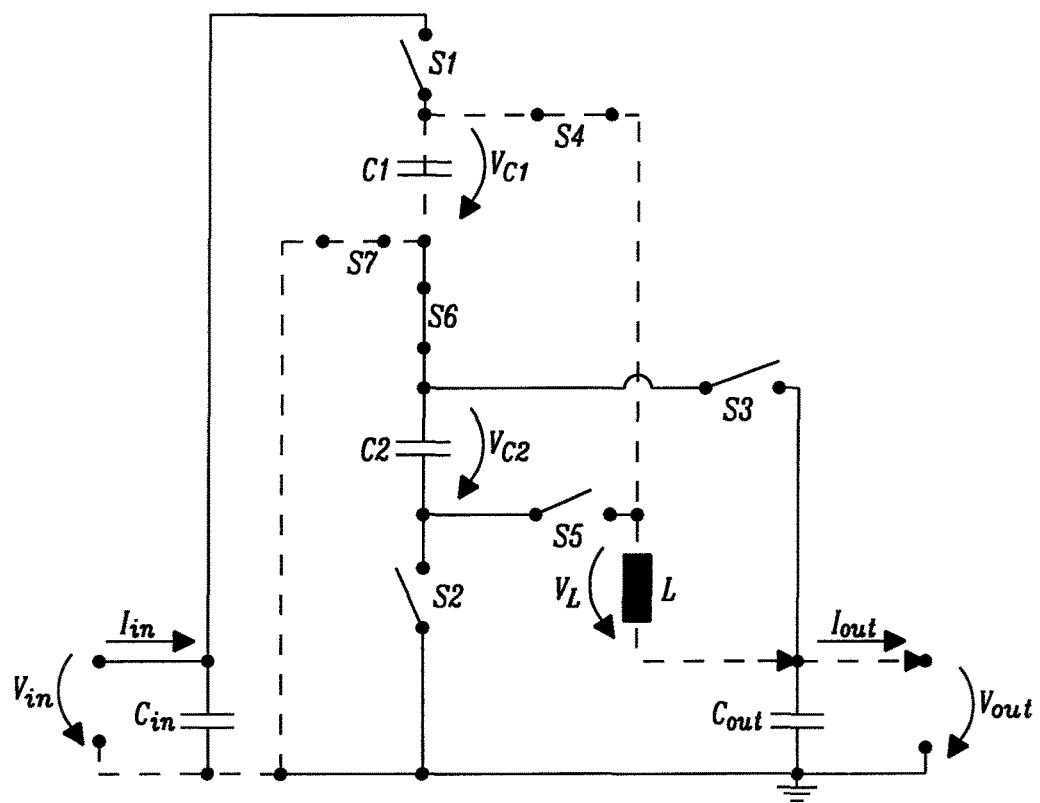

FIGS. 7A, 7B, 7C, 7D, 8A, 8B and 8C show further operation states of the power converter of FIG. 1H, with the operation state of FIG. 7B being a combined bypass state and inductor state and with the operations states of FIGS. 7A, 7C, 7D, 8A, 8B and 8C being pure inductor states. A recurrent sequence of operation states may comprise e.g. the operation states of FIGS. 7A and 7B, or the operation states of FIGS. 7A and 7B in combination with the operation state of FIG. 7C, or the operation states of FIGS. 7A and 7B in combination with the operation state of FIG. 7D, or the operation states of FIGS. 8A and 8B.

FIGS. 1G and 1J show further variants of the power converters of FIGS. 1G and 1H, respectively. The operation states of the power converters shown in FIGS. 1I and 1J are combined bypass and inductor states.

The step-down power converters may be changed into step-up converters with similar properties by exchanging the input port and the output port.

Furthermore, the step-down and/or step-up topologies may be adapted to inverting DCDC conversion and/to power converters with N>2 flying capacitors. An example of a power converter comprises N=4 flying capacitors is shown in FIG. 1K. The power converter of FIG. 1K is obtained by replacing the switching capacitors C1 and C2 of the power converter of FIG. 1A with capacitor networks (C11, C12 and C21, C22, respectively). The capacitor networks may be configured via the switching states of the switches S11 vs. S10 and S12 (S15 vs S14 and S16) from a serial to a parallel configuration. By doing this, sequences of states with high conversion efficiency for $V_{out}$ to $V_{in}$=3:1 (plus 6:1 in light load mode) are enabled.

By adding further switches, the power converter shown in FIG. 1L may be obtained. The power converter of FIG. 1L enables additional switching schemes with increased light load efficiency for conversion ratios from $V_{in}/V_{out}$=2:1 up to 6:1.

The range of conversion ratios with high efficiency can be further extended by using capacitor networks that comprise more than the two reconfigurable capacitors C11+C12 or C21+C22.

FIG. 2 shows a flow chart of an example method 200 for controlling a power converter. The power converter is configured to convert power between a first converter voltage (e.g. $V_{in}$) at a first converter port and a second converter voltage (e.g. $V_{out}$) at a second converter port. The first and second converter voltages may be relative to ground.

The power converter comprises a first capacitor network C, C1 having a first port and a second port. Furthermore, the power converter comprises an inductor L having a first port and a second port. The second port of the inductor L may be (directly) coupled to the second converter port and the first port of the inductor L may be coupled directly or via a switch to the second port of the first capacitor network C, C1. In addition, the power converter comprises a first switching matrix which is configured to arrange the first capacitor network C, C1 and the inductor within different states.

The different states may include a bypass state enabling current to flow from the first converter port or from ground through the first capacitor network C, C1 to the second converter port without going through the inductor L. Furthermore, the different states may include an inductor state enabling current to flow from the first converter port or from ground through the inductor L to the second converter port.

The method 200 comprises controlling 201 the first switching matrix repeatedly in a recurrent sequence of different states, such that a ratio between the first converter voltage and the second converter voltage corresponds to a target conversion ratio. The sequence of different states may comprise the bypass state and the inductor state. Controlling 201 the first switching matrix may comprise varying a duty cycle of the different states in dependence of a target conversion ratio between the first converter voltage and the second converter voltage.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter configured to convert power between a first converter voltage at a first converter port and a second converter voltage at a second converter port; wherein the first and second converter voltages are relative to ground; wherein the power converter comprises,
   a first capacitor network;
   an inductor; wherein the inductor exhibits a saturation current;
   a first switching matrix configured to arrange the first capacitor network and the inductor within different states, including
      a bypass state enabling current to flow from the first converter port through the first capacitor network via a bypass path to the second converter port without going through the inductor; and
      an inductor state enabling current to flow from the first converter port or from ground through the inductor to the second converter port; and
   a control unit configured to control the first switching matrix repeatedly in a recurrent sequence of different states; wherein the sequence of different states comprises the bypass state and the inductor state; wherein the control unit is configured to vary a duty cycle of the different states in dependence of a target conversion ratio between the first converter voltage and the second converter voltage; the control unit is configured to control the first switching matrix such that through the use of a bypass path bypassing the inductor a maximum total converter current at the second converter port is higher than the saturation current of the inductor; the control unit is configured to control the first switching matrix such that through the use of the bypass path bypassing the inductor a maximum total converter current at the second converter port is higher than the saturation current of the inductor.

2. The power converter of claim 1, wherein the control unit is configured to control the first switching matrix to
   cycle through the sequence of different states within a cycle duration; and
   vary a duration of the different states, notably of the bypass state and/or of the inductor state, within the cycle duration in dependence of the target conversion ratio.

3. The power converter of claim 1, wherein
   the first switching matrix is configured to arrange the first capacitor network and the inductor within operation states and transition states;
   a duration of the operation states is varied when varying the duty cycle;
   a duration of the transition states is independent of the target conversion ratio;
   the bypass state and the inductor states are operation states; and
   the transition states are used to pass from one operation state to a subsequent operation state within the recurrent sequence of different states.

4. The power converter of claim 1, wherein
   the first capacitor network comprises a first port and a second port;
   the inductor comprises a first port and a second port;
   the second port of the inductor is coupled to the second converter port;

the first port of the inductor is coupled directly or via a switch to the first or second port of the first capacitor network;
the first switching matrix comprises
a first switch configured to couple the first port of the first capacitor network with the first converter port;
a second switch configured to couple the second port of the first capacitor network with ground; and
a third switch configured to couple the first or second port of the first capacitor network with the second converter port.

5. The power converter of claim 4, wherein the first switching matrix further comprises a fourth switch configured to couple or to decouple the second port of the first capacitor network with or from the first port of the inductor.

6. The power converter of claim 5, wherein
the power converter comprises a second capacitor network having a first port and a second port;
the power converter comprises a second switching matrix;
the second switching matrix comprises
a fifth switch configured to couple the first converter port with the first port of the second capacitor network;
a sixth switch configured to couple the second port of the second capacitor network to ground;
a seventh switch configured to couple the first port of the second capacitor network with the first port of the inductor; and
an eight switch configured to couple the second port of the second capacitor network with the second converter port;
the first and second switching matrices are configured to arrange the first capacitor network, the second capacitor network and the inductor within different states; and
the control unit is configured to control the first and second switching matrices repeatedly in the recurrent sequence of different states.

7. The power converter of claim 6, wherein the sequence of states comprises
a first state with the first switch, fourth switch, fifth switch and the eight switch being closed; and
a second state with the second switch, the third switch, the sixth switch and the seventh switch being closed.

8. The power converter of claim 7, wherein the sequence of states further comprises a third state with the fifth switch and the seventh switch being closed to couple the inductor between the first converter port and the second converter port, or with the fourth switch and the second switch being closed to couple the inductor between the second converter port and ground.

9. The power converter of claim 7, wherein the sequence of states is such that a switching state of at least some of the switches of the first and/or second switching matrix remain unchanged for all or a subset of the states of the sequence of states.

10. The power converter of claim 6, wherein
the power converter comprises a ninth switch configured to couple the first port of the first capacitor network with the first port of the second capacitor network; and
the control unit is configured to control the ninth switch in accordance to the sequence of states.

11. The power converter of claim 10, wherein the sequence of states comprises
a first state with the third switch, the second switch, the fifth switch and the eight switch being closed to couple the first capacitor network between the second converter port and ground and to couple the second capacitor network between the first and second converter port and the remaining switches being such that the inductor is floating;
a second state with the fourth switch, the sixth switch and the ninth switch being closed to couple the inductor and the first and second capacitor networks in series between the second converter port and ground; and
a third state with the sixth switch and the seventh switch being closed to couple the inductor between the second converter port and the first port of the second capacitor network or the second switch and the fourth switch being closed to couple the inductor between the second converter port and ground.

12. The power converter of claim 1, wherein
the first capacitor network comprises a plurality of capacitors;
the first capacitor network comprises a capacitor switching matrix configured to arrange the plurality of capacitors in different configurations; and
the control unit is configured to control the capacitor switching matrix within the sequence of states.

13. The power converter of claim 1, wherein
the first capacitor network comprises a first port and a second port;
the inductor comprises a first port and a second port;
the second port of the inductor is coupled to the second converter port;
the power converter comprises
a second capacitor network having a first port and a second port;
a first switch configured to couple the first port of the first capacitor network with the first converter port;
a second switch configured to couple the second port of the second capacitor network with ground;
a third switch configured to couple the first port of the second capacitor network with the second converter port;
a fourth switch configured to couple the first port of the first capacitor network to the first port of the inductor;
a fifth switch configured to couple the second port of the second capacitor network to the first port of the inductor;
a sixth switch configured to couple the second port of the first capacitor network to the first port of the second capacitor network; and
a seventh switch configured to couple the second port of the first capacitor network to ground.

14. The power converter of claim 1, wherein
the first capacitor network comprises a first port and a second port;
the inductor comprises a first port and a second port;
the second port of the inductor is coupled to the second converter port;
the power converter comprises
a second capacitor network having a first port and a second port;
a first switch configured to couple the first port of the second capacitor network with the first converter port;
a second switch configured to couple the second port of the first capacitor network with ground;
a third switch configured to couple the first port of the first capacitor network with the second converter port;

a sixth switch configured to couple the first port of the first capacitor network to the first port of the second capacitor network;
a seventh switch configured to couple the second port of the second capacitor network to ground; and
an eight switch configured to couple the second port of the second capacitor network to the second converter port;
the first port of the inductor
is coupled to the second port of the first capacitor network or
is coupled the first port of the first capacitor network via a fourth switch; and/or
is coupled to the second port of the first capacitor network via a fifth switch.

15. The power converter of claim 1, wherein
the first capacitor network comprises a first port and a second port;
the inductor comprises a first port and a second port;
the second port of the inductor is coupled to the second converter port;
the power converter comprises
a second capacitor network having a first port and a second port;
a first switch configured to couple the first port of the first capacitor network with the first converter port;
a second switch configured to couple the second port of the second capacitor network with ground;
a third switch configured to couple the first port of the second capacitor network with the second converter port;
a fourth switch configured to couple the second port of the first capacitor network to the first port of the second capacitor network;
a fifth switch configured to couple the second port of the first capacitor network to ground; and
a sixth switch configured to couple the first port of the first capacitor network to the second converter port.

16. The power converter of claim 1, wherein the control unit is configured to
determine a level of a load of the power converter; and
select states for the sequence of states depending on the level of the load.

17. A method of converting power between a first converter voltage at a first converter port and a second converter voltage at a second converter port; wherein the first and second converter voltages are relative to ground; wherein the power converter comprising the steps of:
providing a first capacitor network;
providing an inductor; wherein the inductor exhibits a saturation current;
arranging the first capacitor network and the inductor within different states using a first switching matrix, including the states:
a bypass state enabling current to flow from the first converter port through the first capacitor network via a bypath path to the second converter port without going through the inductor; and
an inductor state enabling current to flow from the first converter port or from ground through the inductor to the second converter port;
controlling, using a control unit, the first switching matrix repeatedly in a recurrent sequence of different states; wherein the sequence of different states comprises the bypass state and the inductor state; wherein the control unit varies a duty cycle of the different states in dependence of a target conversion ratio between the first converter voltage and the second converter voltage; and
controlling the first switching matrix such that through the use of the bypass path bypassing the inductor a maximum total converter current at the second converter port is higher than the saturation current of the inductor.

18. The method of claim 17, wherein the control unit controls the first switching matrix to
cycle through the sequence of different states within a cycle duration; and
vary a duration of the different states, notably of the bypass state and/or of the inductor state, within the cycle duration in dependence of the target conversion ratio.

19. The method of claim 17, wherein
the first switching matrix arranges the first capacitor network and the inductor within operation states and transition states;
a duration of the operation states is varied when varying the duty cycle;
a duration of the transition states is independent of the target conversion ratio;
the bypass state and the inductor states are operation states; and
the transition states are used to pass from one operation state to a subsequent operation state within the recurrent sequence of different states.

20. The method of claim 17, wherein
the first capacitor network comprises a first port and a second port;
the inductor comprises a first port and a second port;
the second port of the inductor is coupled to the second converter port;
the first port of the inductor is coupled directly or via a switch to the first or second port of the first capacitor network;
the first switching matrix comprises
a first switch to couple the first port of the first capacitor network with the first converter port;
a second switch to couple the second port of the first capacitor network with ground; and
a third switch to couple the first or second port of the first capacitor network with the second converter port.

* * * * *